United States Patent
Pettey

(10) Patent No.: US 7,149,817 B2
(45) Date of Patent: Dec. 12, 2006

(54) INFINIBAND TM WORK QUEUE TO TCP/IP TRANSLATION

(75) Inventor: Christopher J. Pettey, Cedar Park, TX (US)

(73) Assignee: NetEffect, Inc., Austin, TX (US)

( * ) Notice: Subject to any disclaimer, the term of this patent is extended or adjusted under 35 U.S.C. 154(b) by 748 days.

(21) Appl. No.: 09/784,761

(22) Filed: Feb. 15, 2001

(65) Prior Publication Data

US 2003/0014544 A1   Jan. 16, 2003

(51) Int. Cl.
G06F 15/16 (2006.01)
G06F 15/173 (2006.01)
G06F 15/177 (2006.01)
G06F 15/00 (2006.01)
G06F 3/00 (2006.01)

(52) U.S. Cl. ............... 709/250; 709/238; 709/201; 709/220; 709/200; 709/203; 709/231; 709/213; 719/313; 711/147

(58) Field of Classification Search ............... 710/105, 710/3; 370/401, 228; 709/212, 232, 238; 375/371

See application file for complete search history.

(56) References Cited

U.S. PATENT DOCUMENTS

| | | | |
|---|---|---|---|
| 6,243,787 B1 * | 6/2001 | Kagan et al. ............... | 710/263 |
| 6,389,479 B1 | 5/2002 | Boucher et al. | |
| 6,427,171 B1 | 7/2002 | Craft et al. | |
| 6,535,518 B1 * | 3/2003 | Hu et al. ..................... | 370/401 |
| 6,591,310 B1 * | 7/2003 | Johnson ........................ | 710/3 |
| 6,594,329 B1 * | 7/2003 | Susnow ...................... | 375/372 |
| 6,661,773 B1 * | 12/2003 | Pelissier et al. ............ | 370/228 |
| 6,675,200 B1 * | 1/2004 | Cheriton et al. ............ | 709/212 |
| 6,690,757 B1 * | 2/2004 | Bunton et al. .............. | 375/371 |
| 6,693,901 B1 * | 2/2004 | Byers et al. ................ | 370/362 |
| 6,697,868 B1 | 2/2004 | Craft et al. | |
| 6,751,235 B1 * | 6/2004 | Susnow et al. ............. | 370/503 |
| 2002/0073257 A1 * | 6/2002 | Beukema et al. ........... | 710/105 |
| 2002/0147839 A1 | 10/2002 | Boucher et al. | |
| 2002/0161919 A1 | 10/2002 | Boucher et al. | |
| 2003/0031172 A1 | 2/2003 | Grinfeld | |
| 2003/0200284 A1 | 10/2003 | Philbrick et al. | |
| 2003/0237016 A1 * | 12/2003 | Johnson et al. ............. | 714/4 |
| 2004/0015622 A1 * | 1/2004 | Avery .......................... | 710/22 |

OTHER PUBLICATIONS

"Intel Virtual Interface (VI) Architecture Performance Suite User's Guide", Dec. 1998.*
"Construction of Virtual Private Distributed System by Comet", Jinzaki, Jan. 2000.*

(Continued)

*Primary Examiner*—Bunjob Jaroenchonwanit
*Assistant Examiner*—Philip Lee
(74) *Attorney, Agent, or Firm*—Richard K. Huffman; James W. Huffman

(57) ABSTRACT

A TCP-aware target adapter for accelerating TCP/IP connections between clients and servers, where the servers are interconnected over an Infiniband™ fabric and the clients are interconnected over a TCP/IP-based network. The TCP-aware target adapter includes an accelerated connection processor and a target channel adapter. The accelerated connection processor bridges TCP/IP transactions between the clients and the servers. The accelerated connection processor accelerates the TCP/IP connections prescribing Infiniband remote direct memory access operations to retrieve/provide transaction data from/to the servers. The target channel adapter is coupled to the accelerated connection processor. The target channel adapter supports Infiniband operations with the servers, including execution of the remote direct memory access operations to retrieve/provide the transaction data. The TCP/IP connections are accelerated by offloading TCP/IP processing otherwise performed by the servers to retrieve/provide said transaction data.

40 Claims, 16 Drawing Sheets

OTHER PUBLICATIONS

"Virtual Interface (VI) Architecture Overview", Pathikonda et al., Apr. 1998.*

"Realizing the Performance Potential of the Virtual Interface Architecture", Speight et al. 1999.*

* cited by examiner

INFINIBAND TM WORK QUEUE TO TCP/IP TRANSLATION

BACKGROUND OF THE INVENTION

1. Field of the Invention

This invention relates in general to the field of computer communications and more specifically to an apparatus and method for accelerating TCP/IP client-server connections over an Infiniband™ Architecture fabric.

2. Description of the Related Art

The first computers were stand-alone machines, that is, they loaded and executed application programs one-at-a-time in an order typically prescribed through a sequence of instructions provided by keypunched batch cards or magnetic tape. All of the data required to execute a loaded application program was provided by the application program as input data and execution results were typically output to a line printer. Even though the interface to early computers was cumbersome at best, the sheer power to rapidly perform computations made these devices very attractive to those in the scientific and engineering fields.

The development of remote terminal capabilities allowed computer technologies to be more widely distributed. Access to computational equipment in real-time fostered the introduction of computers into the business world. Businesses that processed large amounts of data, such as the insurance industry and government agencies, began to store, retrieve, and process their data on computers. Special applications were developed to perform operations on shared data within a single computer system.

During the mid 1970's, a number of successful attempts were made to interconnect computers for purposes of sharing data and/or processing capabilities. These interconnection attempts, however, employed special purpose protocols that were intimately tied to the architecture of these computers. As such, the computers were expensive to procure and maintain and their applications were limited to those areas of the industry that heavily relied upon shared data processing capabilities.

The U.S. government, however, realized the power that could be harnessed by allowing computers to interconnect and thus funded research that resulted in what we now know today as the Internet. More specifically, this research provided a series of standards that specify the details of how interconnected computers are to communicate, how to interconnect networks of computers, and how to route traffic over these interconnected networks. This set of standards is known as the TCP/IP Internet Protocol Suite, named after its two predominant protocol standards, Transport Control Protocol (TCP) and Internet Protocol (IP). The use of TCP/IP allows a computer to communicate across any set of interconnected networks, regardless of the underlying native network protocols that are employed by these networks. Once the interconnection problem was solved by TCP/IP, networks of interconnected computers began to crop up in all areas of business.

The ability to easily interconnect computer networks for communication purposes provided the motivation for the development of distributed application programs, that is, application programs that perform certain tasks on one computer connected to a network and certain other tasks on another computer connected to the network. The sophistication of distributed application programs has steadily evolved over more recent years into what we today call the client-server model. According to the model, "client" applications on a network make requests for service to "server" applications on the network. The "server" applications perform the service and return the results of the service to the "client" over the network. In an exact sense, a client and a server may reside on the same computer, but the more common employment of the model finds clients executing on smaller, less powerful, less costly computers connected to a network and servers executing on more powerful, more expensive computers. In fact, the proliferation of client-server applications has resulted in a class of high-end computers being known as "servers" because they are primarily used to execute server applications. Similarly, the term "client machine" is often used to describe a single-user desktop system that executes client applications. Client-server application technology has enabled computer usage to be phased into the business mainstream. Companies began employing interconnected client-server networks to centralize the storage of files, company data, manufacturing data, etc., on servers and allowed employees to access this data via clients. Servers today are sometimes known by the type of services that they perform. For example, a file server provides client access to centralized files and a mail server provides access to a companies electronic mail.

The development of other technologies such as hypertext markup language (HTML) now allows user-friendly representations of data to be transmitted between computers. The advent of HTML-based developments has resulted in an exponential increase in the number of computers that are interconnected because, now, even home-based businesses can develop server applications that provide services accessible over the Internet from any computer equipped with a web browser application (i.e., a web "client"). Furthermore, virtually every computer produced today is sold with web client software. In 1988, only 5,000 computers were interconnected via the Internet. In 1995, under 5 million computers were interconnected via the Internet. But with the maturation of client-server and HTML technologies, presently, over 50 million computers access the Internet. And the growth continues.

Client machines make thousands of requests over the Internet to server sites every second of every day. And every time a request is made to a server, data resulting from the request must be provided to a client over the Internet in accordance with the protocols laid down by TCP/IP. TCP/IP is a layered set of protocols that results in the decomposition of data that to be transmitted over the network into a sequence of packets. The work that is required to break up the data into packets, along with the processing required to ensure that packets arrive at their final destination, is accomplished by the server that provides the data. In fact, one skilled in the art will appreciate that a significant amount of a server's processing resources are burdened with the processing of TCP/IP protocol-related functions rather than processing to provide the services themselves. When a server designates a set of data that is to be transmitted to a client, hundreds to thousands of TCP/IP functions must be executed by the processor within the server to break up the data into packets, and to monitor transmission of the packets to the client. This is a problem that presently plagues the industry because TCP/IP processing is largely viewed as an overhead function, thus precluding servers from exploiting their full processing capabilities for the provision of services. And as the number of computers connected to the Internet continues to grow, the number of client requests to heavily used service providers will only increase.

Therefore, what is needed is an apparatus that enables a server to respond to an increased number of client requests for service without experiencing a commensurate increase in TCP/IP-related processing requirements.

In addition, what is needed is an apparatus that allows a server to offload TCP/IP-related processing functions so that processing resources in the server can emphasize the transfer of data to clients.

Furthermore, what is needed is a means for performing TCP/IP-related functions to transfer data to a client machine, where the functions are provided for by an apparatus apart from a server that generates the data.

Moreover, what is needed is a method for transferring client-server data that does not require a server to perform TCP/IP-related functions in order to transfer the data.

SUMMARY OF THE INVENTION

To address the above-detailed deficiencies, it is an object of the present invention to provide an apparatus that performs the TCP/IP-related processing functions normally attributed to a server.

Accordingly, in the attainment of the aforementioned object, it is a feature of the present invention to provide a TCP-aware target adapter, for accelerating TCP/IP connections between a plurality of clients and a plurality of servers. The plurality of servers are accessed via an Infiniband fabric and the plurality of clients are accessed via a TCP/IP network. The TCP-aware target adapter includes an accelerated connection processor and a target channel adapter. The accelerated connection processor bridges TCP/IP transactions between the plurality of clients and the plurality of servers, where the accelerated connection processor accelerates the TCP/IP connections by prescribing Infiniband remote direct memory access operations to retrieve/provide transaction data from/to the plurality of servers. The target channel adapter is coupled to the accelerated connection processor. The target channel adapter supports Infiniband operations with the plurality of servers, and executes the remote direct memory access operations to retrieve/provide the transaction data. The accelerated connection processor has a connection correlator that is configured to associate TCP/IP connection parameters with a target work queue number for each of a plurality of accelerated TCP/IP connections. The TCP/IP connections are accelerated by offloading TCP/IP processing otherwise performed by the plurality of servers to retrieve/provide said transaction data.

An advantage of the present invention is that a server's capacity to perform other processing functions is significantly increased.

Another object of the present invention is to provide an apparatus in a server that allows TCP/IP transaction data to be transferred to a client machine without requiring that the server perform the processing to decompose the transaction data into packets and to execute TCP/IP transactions to transfer the packets to the client machine.

In another aspect, it is a feature of the present invention to provide an apparatus in a server connected to an Infiniband fabric for implementing accelerated TCP/IP connections between the server and clients. The clients are connected to a TCP/IP network. The apparatus has a connection acceleration driver and a host channel adapter. The connection acceleration driver manages the accelerated TCP/IP connections, where the connection acceleration driver designates memory locations within server memory such that transaction data can be retrieved/provided via Infiniband remote direct memory access operations. The host channel adapter is coupled to the connection acceleration driver. The connection acceleration driver has correlation logic that is configured to associate TCP/IP connection parameters with a host work queue number for each of the accelerated TCP/IP connections. The host channel adapter executes Infiniband operations via the Infiniband fabric, and executes direct memory access functions to retrieve/provide the transaction data responsive to the Infiniband remote direct memory access operations. The accelerated TCP/IP connections offload TCP/IP processing otherwise performed by the server to retrieve/provide said transaction data.

Another advantage of the present invention is that servers no longer need be closely tied to performing protocol-related operations to ensure that data is provided to clients on a network.

Yet another object of the present invention is to provide an apparatus and method for rapidly transferring data from a server to clients connected to a TCP/IP network.

In yet another aspect, it is a feature of the present invention to provide an apparatus within a client-server environment for managing an accelerated TCP/IP connection between a server connected to an Infiniband fabric and a client connected to a TCP/IP network. The apparatus includes a host driver and a TCP-aware target adapter. The host driver provides a host work queue pair through which transaction data corresponding to the accelerated TCP/IP connection is transmitted/received via the Infiniband fabric. The TCP-aware target adapter is coupled to the host driver. The TCP-aware target adapter provides a target work queue pair corresponding to the host work queue pair. The TCP-aware target adapter executes a remote direct memory access operation to receive/transmit the transaction data via the Infiniband fabric. The TCP-aware target adapter includes a connection correlator, for associating TCP/IP connection parameters for the accelerated connection with the a target work queue number corresponding to the target work queue pair. The accelerated TCP/IP connection offloads TCP/IP processing otherwise performed by the server to receive/transmit said transaction data.

In a further aspect, it is a feature of the present invention to provide a method for accelerating TCP/IP connections in a client-server environment having clients that are connected to a TCP/IP network and servers that are connected to an Infiniband fabric. The method includes mapping TCP/IP connection parameters for accelerated connections to corresponding host and target work queue numbers that correspond to host and target work queue pairs, and offloading TCP/IP processing otherwise performed by the servers by executing Infiniband remote direct memory access operations to retrieve/transmit data associated with the accelerated connections from/to memory within the servers.

In yet a further aspect, it is a feature of the present invention to provide a method for offloading server TCP/IP processing in a client-server environment. The method includes bypassing a TCP/IP stack otherwise employed in a server by utilizing remote direct memory access operations via an Infiniband fabric to directly access data from/to server memory, where the data is provided to/from a TCP-aware target adapter, the TCP-aware target adapter providing native network ports that connect to clients; and via the TCP-aware target adapter, generating native network transactions to transfer the data to/from clients. The utilizing includes associating TC/IP connection parameters for a particular TCP/IP connection with a work queue number that corresponds to a work queue pair within the TCP-aware target adapter; and issuing remote direct access requests to the work queue pair.

In still another aspect, it is a feature of the present invention to provide a TCP-aware target adapter, for accelerating TCP/IP connections between a plurality of clients and a plurality of servers, the plurality of servers being accessed via an Infiniband fabric, the plurality of clients being accessed via a TCP/IP network. The TCP-aware target adapter has an accelerated connection processor and a target channel adapter. The accelerated connection processor bridges TCP/IP transactions between the plurality of clients and the plurality of servers, where the accelerated connection processor accelerates the TCP/IP connections by prescribing remote direct memory access operations to retrieve/ provide transaction data from/to the plurality of servers. The accelerated connection processor includes a connection correlator that is configured to associate TCP/IP connection parameters which uniquely identify the TCP/IP connections with corresponding work queue numbers. The target channel adapter is coupled to the accelerated connection processor. The target channel adapter supports Infiniband operations with the plurality of servers, and executes the remote direct memory access operations to retrieve/provide the transaction data, and routes the transaction data to/from the plurality of clients as embedded payloads within Infiniband packets. The TCP/IP connections are accelerated by offloading TCP/IP processing otherwise performed by the plurality of servers to retrieve/provide said transaction data.

In yet another aspect, it is a feature of the present invention to provide an Infiniband-to-native protocol translation apparatus, for routing TCP/IP transactions between a plurality of clients and a plurality of Infiniband devices. The plurality of Infiniband devices are accessed via an Infiniband fabric and the plurality of clients are accessed via a TCP/IP network. The Infiniband-to-native protocol translation apparatus has an unaccelerated connection processor and a target channel adapter. The unaccelerated connection processor bridges the TCP/IP transactions between the plurality of clients and the plurality of Infiniband devices by encapsulating/stripping the TCP transactions within/from Infiniband raw packets. The unaccelerated connection processor includes an unaccelerated connection correlator. The unaccelerated connection correlator maps native addresses to/from Infiniband local identifiers and work queue numbers. The target channel adapter is coupled to the unaccelerated connection processor. The target channel adapter receives/transmits said Infiniband raw packets from/to the plurality of Infiniband devices.

Another advantage of the present invention is that the number of servers within a data center can be increased over the Infiniband fabric without impacting the techniques employed to interface the servers to a client TCP/IP network.

BRIEF DESCRIPTION OF THE DRAWINGS

These and other objects, features, and advantages of the present invention will become better understood with regard to the following description, and accompanying drawings where.

DETAILED DESCRIPTION

In view of the above background on techniques for establishing and managing TCP/IP connections within a client-server environment, several related art examples are now described with reference to FIGS. 1 through 3. These examples illustrate the limitations of present day TCP/IP connection management techniques, particularly when such techniques are applied to client-server environments that require upward scaling of server capabilities in order to handle a steadily increasing number of client requests. Following this discussion, a detailed description of the present invention will be presented with reference to FIGS. 4 through 12. Use of the present invention 1) permits servers to offload virtually all of the processing associated with TCP/IP transactions and 2) provides an architectural configuration whereby additional servers can be added to a data center installation without impacting existing servers.

Figure 1:
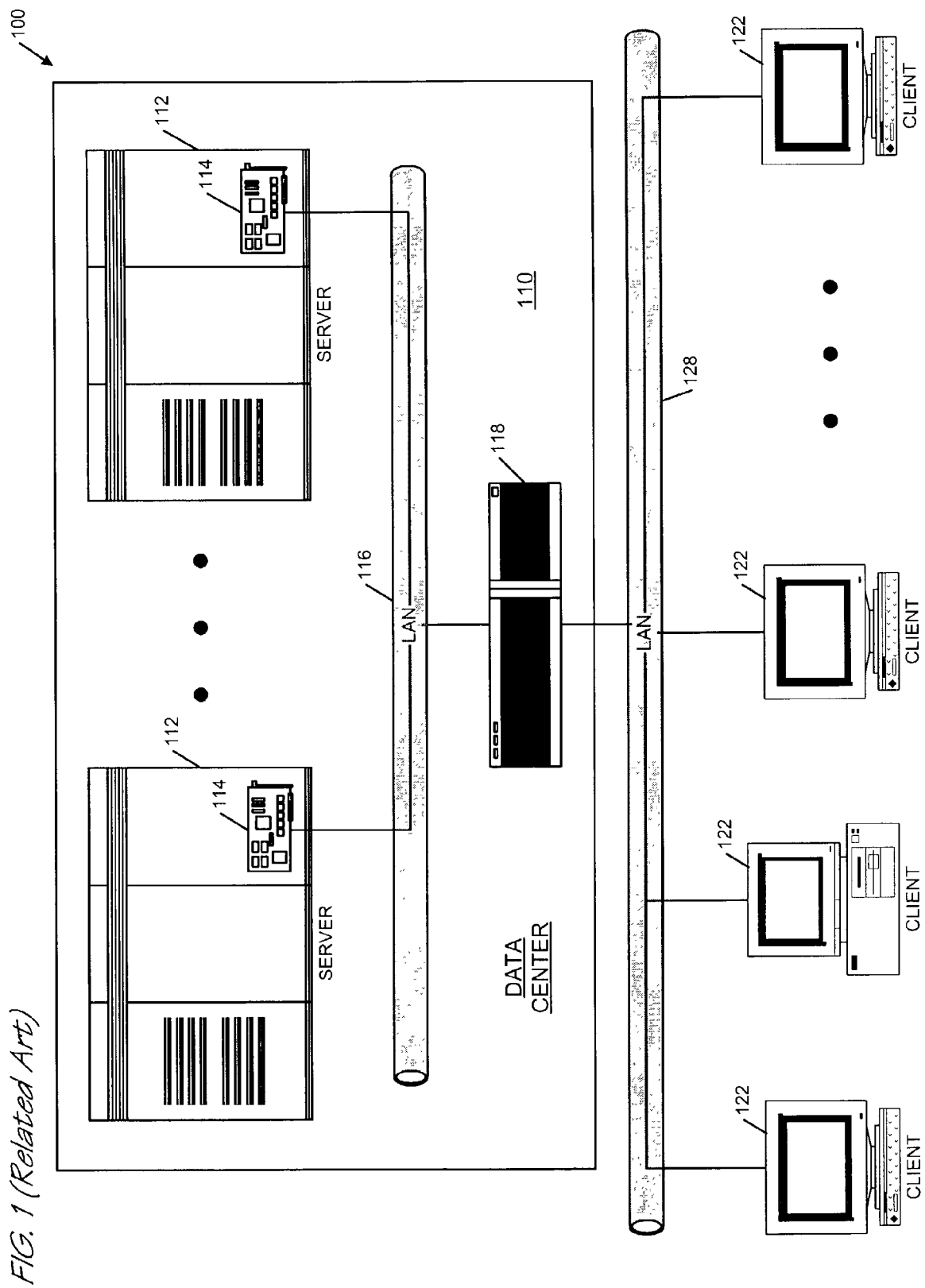
FIG. 1 is a related art diagram illustrating a typical present day client-server TCP/IP communications network.

Now referring to FIG. 1, a related art diagram is presented illustrating a typical present day client-server TCP/IP communications network 100. The TCP/IP communications network 100 includes one or more servers 112 that are located within a data center 110. The servers 112 are interconnected over a data center local area network (LAN) 116 via network interface cards (NICs) 114. The data center LAN 116 and NICs 114 provide the underlying data link layer and physical link layer structures to support layered TCP/IP communications. These underlying structures enable the servers 112 to communicate with one another using native LAN transactions conforming to a specific native LAN protocol. Several different native LAN protocols are in use today. These protocols include, but are not limited to, Ethernet, Wireless Ethernet, Fiber Distributed Data Interconnect (FDDI), Attached Resource Computer Network (ARCNET), Synchronous Optical Network (SONET), Asynchronous Transfer Mode (ATM), and Token Ring. Each of these native protocols exhibits different strengths and weaknesses with regard to certain system characteristics such as speed, capacity, cost, reliability, manageability, etc., yet they are very much alike in the manner in which they interface to upper layer protocols within a TCP/IP communications environment 100. An in-depth discussion of each of the native protocols, however, is beyond the scope of this application. One skilled in the art will nevertheless comprehend that a present day data center 110 typically implements a server LAN 116 conforming to one specific native protocol based upon certain goals and constraints of the data center system design. At this point in time, Ethernet, in its various forms, is perhaps the most widely used protocol for implementing a data center LAN 116.

It is not uncommon today to find data centers 110 that have upwards to a hundred servers 112 interconnected over a LAN 116. As noted above, each of the servers 112 interface to the LAN 116 via a network interface card (NIC) 114. The NIC 114 enables a server 112 to generate and receive TCP/IP transactions over the LAN 116 in accordance with the particular native network protocol that is employed by the LAN 116. Hence, Ethernet NICs 114 are used to interconnect servers 112 over an Ethernet LAN 116. Similarly, token-ring NICs 114 are used to interconnect servers 112 in a token-ring network 116. The use of NICs 114 and related driver software within a server 112 to interface the server 112 to other servers 112 over a local network 116 is a feature common to many LANs 116, regardless of which native network protocol is chosen.

The client-server TCP/IP communications environment 100 also includes a number of clients 122 that are interconnected over a client LAN 128. The client LAN 128 may or may not employ the same native network protocol as is employed by the data center LAN 116. Like the servers 112, each of the clients 122 must have a protocol-compliant NIC (not shown) to connect up to the client LAN 128. FIG. 1 also shows a router 118 within the data center 110. The router 118 is connected to both the data center LAN 116 and the client LAN 128 and provides a path for transactions to pass between the server LAN 116 and the client LAN 128.

At a basic level of operation, a server 112 communicates over the server LAN 116 to another server 112 by providing the address of the other server's NIC 114 within a native network transaction. In an Ethernet LAN environment, native network transactions are referred to as frames; Ethernet addresses contained within the frames are referred to as media access control (MAC) addresses. Hence, an exemplary Ethernet frame contains a destination MAC address that designates a destination NIC 114 (and consequently, a destination server 112) along with a source MAC address designating the NIC 114 that originated the frame. In addition to source and destination MAC addresses, a typical native frame includes connection fields that describe other characteristics of the native network connection. Connection parameters are typically segregated along with the MAC addresses into a portion of the frame known as a frame header. The remainder of the frame is called a frame payload. The frame payload contains the data that is to be delivered from the source MAC address to the destination MAC address. For clarity purposes within this application, regardless of which native protocol a particular LAN 116 employs, native transactions are hereinafter referred to as frames and the native source and destination addresses are referred to as source MAC and destination MAC addresses.

Within a layered TCP/IP communications environment 100, the native network frame payload consists of one or more IP packets. An IP packet, or IP datagram, is the unit of transaction associated with the next-higher protocol layer within the TCP/IP environment 100, the IP layer. Like the native frame, the IP packet consists of an IP header that contains source and destination IP addresses, other IP connection parameters, and an IP packet payload. The IP payload contains one or more TCP datagrams, which is the unit of transmission for the TCP layer, that is, the protocol layer above the IP layer within the TCP/IP environment 100. And like the native frame and IP packet, the TCP datagram has a TCP header containing source and destination TCP port numbers and other TCP connection parameters, and a TCP datagram payload. It is the TCP payload that contains the data that a particular server 112 desires to send to another server 112.

Since the clients 122 are interconnected over a different local network 128 than the servers 112, if a particular server 112 desires to send data to a particular client 122, then the particular server 112 sends a native frame having a destination MAC address associated with the router 118 because the router 118 is the device on the local network 116 that provides a path to the client network 128. And though the native frame provides the destination MAC address of the router 118, the IP packet within the native frame contains the destination IP address of the particular client 122. Consequently, one of the router's functions is to use the IP address of the particular client 122 to identify it's MAC address on the client LAN 128, and thereby route the native frame to the particular client 122. If the server LAN 116 and the client LAN 128 both utilize the same native protocol, then the router merely modifies the native frame header to provide appropriate source and destination MAC addresses such that the native frame is properly routed to the particular client 122 over the client network 128. If the server LAN 116 and client LAN 128 employ different native network protocols, then the router 118 must perform additional functions that are required to ensure not only that the correct client MAC address is determined, but also to ensure that the IP packet contained within the native network frame is properly translated into a different native network frame that conforms to the native protocol of the client LAN 128. In these types of instances, the router 118 is sometimes referred to as a gateway 118 or a bridge 118.

Application programs on the clients 122 and the servers 112 benefit from the advantages of a TCP/IP communications network 100 in that a large number of simple and cost-effective client machines 122 can utilize TCP/IP transactions to request and receive services that are provided by one or more servers 112. Strictly speaking, the term "server" applies to an application program that offers a service that can be reached over a network. The server application program accepts a request for the service over the network, it performs the requested service, and typically sends back a response to the requester. TCP/IP transactions are employed to transmit the request and the response. An application program making a request for service is referred to as a "client." Strict terminology notwithstanding, since application programs always execute on computers, it is common in the art to find that the actual computers upon which the application programs execute are referred to as servers 112 and clients 122.

The services provided by the servers 112 may be simple or they may be complex. A single set of services may exist on a single server computer 112, or the server computer 112 may be executing several server application programs, or a single server application program may be distributed between several server computers 112. Generally speaking, one often finds dedicated servers 112 within an organization that provide e-mail messaging services to a number of clients 122; ergo the term "mail server" is often used to describe these types of servers 112. Many businesses also utilize servers 112 to provide for centralized storage and distribution of files (i.e., "file servers"). Some servers 112 perform more specialized services such as authenticating secure IP packets (i.e., "IP security servers"). But the most significant growth of services over the past 10 years has occurred in the area of web page storage and distribution (i.e., "web servers"). Through the proliferation of technologies such as hypertext markup language (HTML), literally hundreds of thousands of businesses and individuals have been able to construct and operate servers 112 for distributing data in the form of HTML web pages to any client machine 122 that employs a web client application program. MICROSOFT® INTERNET EXPLORER® web browser is one example of a web client, or web browser.

A data center 110 that is configured for web services may experience hundreds of thousands of service requests every hour from clients 122 all over the world. In this sense, FIG. 1 illustrates the major components of a TCP/IP client-server environment 100. For these types of high-volume data centers 110 (also referred to as "server farms"), the server LAN 116 may interconnect hundreds of servers 112. Accordingly, the router 118 of FIG. 1 may indeed represent several different routers 118 and/or protocol-to-protocol translation devices 118 that interface to a number of different client networks 128. The interconnectivity powers of the Internet rest upon the layered nature of TCP/IP. Layering insulates application programs and higher-level TCP/IP layers from the eccentricities associated with lower-level native network protocols. Through the use of TCP/IP transactions, an application program in a client computer 122 is able to "talk" to another application program in a server computer 112, without either of the two computers 112, 122 having any a priori knowledge of the specific underlying native network protocol that is employed by the other computer 122, 112.

In addition to what has been described above, the router 118 may perform functions above and beyond routing frames and performing native protocol translation. For example, in installations 110 having numerous servers 112 that each execute the same server application program, the router 118 may also be called upon to select a specific server 112 to which service requests are provided in order to balance the workload of all of the servers 112. In this type of installation, the router 118 is called a load balancer 118. In other installations 110, the router 118 examines incoming packets and discards certain undesirable packets. When a router 118 examines and discards undesirable packets, it is called a firewall 118. Although routers 118 may perform a number of additional functions in a data center 110, their basic function is to efficiently route network frames to their proper destination MAC addresses.

Figure 2:
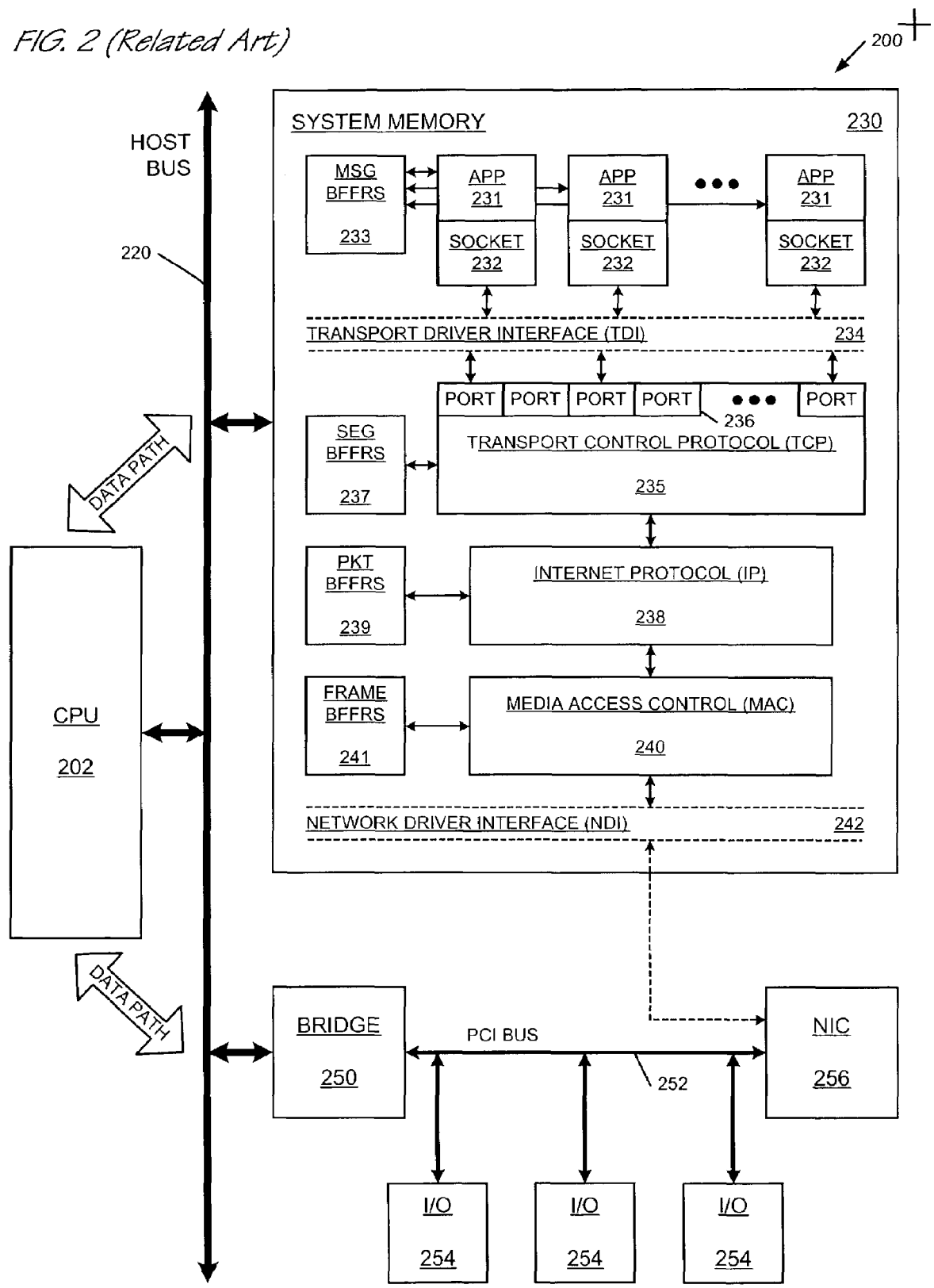
FIG. 2 is a related art block diagram depicting how TCP/IP transactions are executed within a present day server.

Now referring to FIG. 2, a related art block diagram 200 is presented depicting how TCP/IP transactions are processed within a present day server. The discussion with reference to FIG. 1 described how data from an application program in a server/client is embedded within the payload of a TCP datagram. The TCP datagram is then embedded within the payload of an IP packet, which is in turn embedded within the payload of a native network frame. The native frame is then transmitted to a destination client/server that corresponds to a destination IP address contained in the IP header of the transaction. The TCP header contains a TCP port number within the destination client/server through which the transaction data is passed to a destination application program. FIG. 2 is thus provided to present the function of hardware and software elements within a typical server for processing transactions at each TCP/IP protocol layer. The block diagram 200 depicts a CPU 202 connected to system memory 230 via a host bus 220. In a typical server, the CPU 202 is also connected to system I/O devices 254, 256 via a bus bridge 250. A NIC 256 is a particular type of I/O device that provides interconnectivity to a local network (not shown). A Peripheral Component Interconnect (PCI) bus 252 is shown interconnecting the I/O elements 254 and the NIC 256 to the bridge 250. PCI is the prevailing standard today for I/O bus architectures.

The system memory 230 contains one or more application programs 231, each of which is coupled to corresponding message buffers 233. The message buffers 233 contain data to be transmitted via TCP/IP transactions, or they designate memory locations 233 into which TCP/IP transaction data is to be received. The application programs 231 interface to a TCP processing module 235 via one or more TCP ports 236. Interface to the TCP layer 235 of a server's operating system is a strictly controlled aspect of the operating system that is typically specified in terms of a transport driver interface (TDI) 234. In other words, the TDI 234 is the controlled point at which an application 231 interfaces to TCP 235. Within virtually all TCP/IP-enabled operating systems today, a socket 232 is the means by which an application program 231 interfaces to TCP 235 via the TDI 234. For an established TCP/IP connection between a server and a client, a corresponding socket 232 defines the parameters of the connection. These connection parameters include designation of a TCP port 236 on the server through which the connection exists, a corresponding TCP port designation for the client, the IP address of the server, the IP address of the client, and a file handle employed by the application program to send and receive data.

The block diagram 200 also shows TCP segment buffers 237 in memory 230 that are accessed by the TCP module 235. The TCP module 235 is coupled to an IP processing module 238 having its own set of packet buffers 239. The IP module 238 is coupled to a MAC processing module 240 that has a corresponding set of frame buffers 241. Like the interface to the transport layer 235, most operating systems strictly control the interface to the native network layer, which is typically specified in terms of a network driver interface 242. Note however, that although the NDI 242 is the specified interface between the MAC layer 240 and corresponding NIC 256, the interface 242 within a present day server/client is not direct; interface of the MAC layer 240 to the NIC 256 is accomplished through the CPU 202. Indeed, all native transaction processing, as well as processing of IP packets, TCP datagrams, and application program messages, is performed by the CPU 202. The direct interface from the NDI 242 to the NIC (and hence, to a local area network) is through the CPU 202, across the host bus 220, though the bridge 250, across the PCI bus 252, and finally to the NIC 256.

To carry out a TCP/IP transaction between an application program 231 on the server and a corresponding client application, the server application 231 must first designate message buffers 233 for the transmission and reception of transaction data. Once the parameters of the TCP/IP connection have been established (i.e., the socket 232 parameters have been agreed upon between the server application program 231 and the client application program), the host application 231 can initiate transfer of transaction data to the client application by issuing a "send" command to the operating system. Reception of data is enabled via a "listen" or "receive" command. In response to a send command, the TCP processing module 235 copies the transaction data from the designated message buffer 233 to its own segment buffers 237 and executes functions on the CPU 202 to construct TCP datagrams for transmission to the client. For large messages, the TCP layer 235 breaks up the transaction data into many TCP datagrams. Connection parameters from the socket 232 denote source/destination port addresses for the TCP datagram headers. Each of the TCP datagrams is passed to the next-lower IP layer 238. The IP layer 238 copies the TCP datagrams into its own packet buffers 239 and, using IP address parameters provided by the socket 232, the IP layer 238 executes functions on the CPU 202 to generate IP headers for routing the IP packets over the Internet to the client. Each generated IP packet is provided to the MAC layer processing module 240. The MAC module 240 copies the IP packets into its set of frame buffers 241 and generates frame headers for transmitting frames over the local area network to which the server is connected. Transfer of the frames from the MAC layer 240 to the NIC 256 is accomplished through the CPU 202. The NIC 256, in turn, converts each of the frames into symbols that are transmitted over the physical LAN, either to the destination client, or to a router/gateway that will direct the frames to the client's network.

The architectural model depicted in FIG. 2 exemplifies a typical TCP/IP stack as implemented within a present day server operating system. Generally speaking, the applications 231 perform functions in cooperation with client applications to provide such services as mail transfer, file transfer, web page distribution, etc. The transport layer 235 manages the transfer of application data from the server to the clients. The IP layer 238 is responsible for routing the IP packets over the Internet to the client. As such, the IP layer 238 shields higher-level layers 235, 231 from lower-level network architectures. Because the IP layer 238 is provided to route IP packets, it does not ensure reliable transmission of data from an origination point to a destination point. Functions to ensure reliable data transmission reside in the transport layer 235. The MAC layer 240, or data link layer 240, is the layer that interfaces the IP layer 238 to the NIC 256, that is, the actual network hardware 256. Depending on the specific native network protocol that is employed, this layer 240 may or may not provide for reliable delivery, and the transmission of native frames over the local network medium may be packet-oriented or stream-oriented.

The above discussion provides a general overview of how present day systems employ a layered protocol architecture for inter-application communications. An in-depth discussion of TCP/IP stack layers is not required for this application. It is sufficient for one skilled in the art to note that typical present day servers employ the module layers 231, 235, 238, 240 presented in FIG. 2 to implement TCP/IP communications. Furthermore, one skilled in the art will appreciate from this discussion that all of the processing functions and data transfers that are required within each of the layers 231, 235, 238, 240 to effect a TCP/IP transaction must be performed by the CPU 202. Header generation functions, data copy functions, functions related to the disassembly and assembly of complete messages, flow control functions, and error detection and correction functions—all of these functions require processing by the CPU 202.

As mentioned above, the management of TCP/IP connections within a server requires a great deal of dedicated CPU processing time that could otherwise be spent providing the actual services for which the server is configured. But because TCP/IP processing functions are now an integral part of present day operating systems, and because the virtually all network interface cards 256 interface to a host's PCI bus 252, the ensuing result is a server CPU 202 that is significantly occupied with the processing of intermediate TCP/IP functions rather than processing associated with the direct provision of services.

Figure 3:
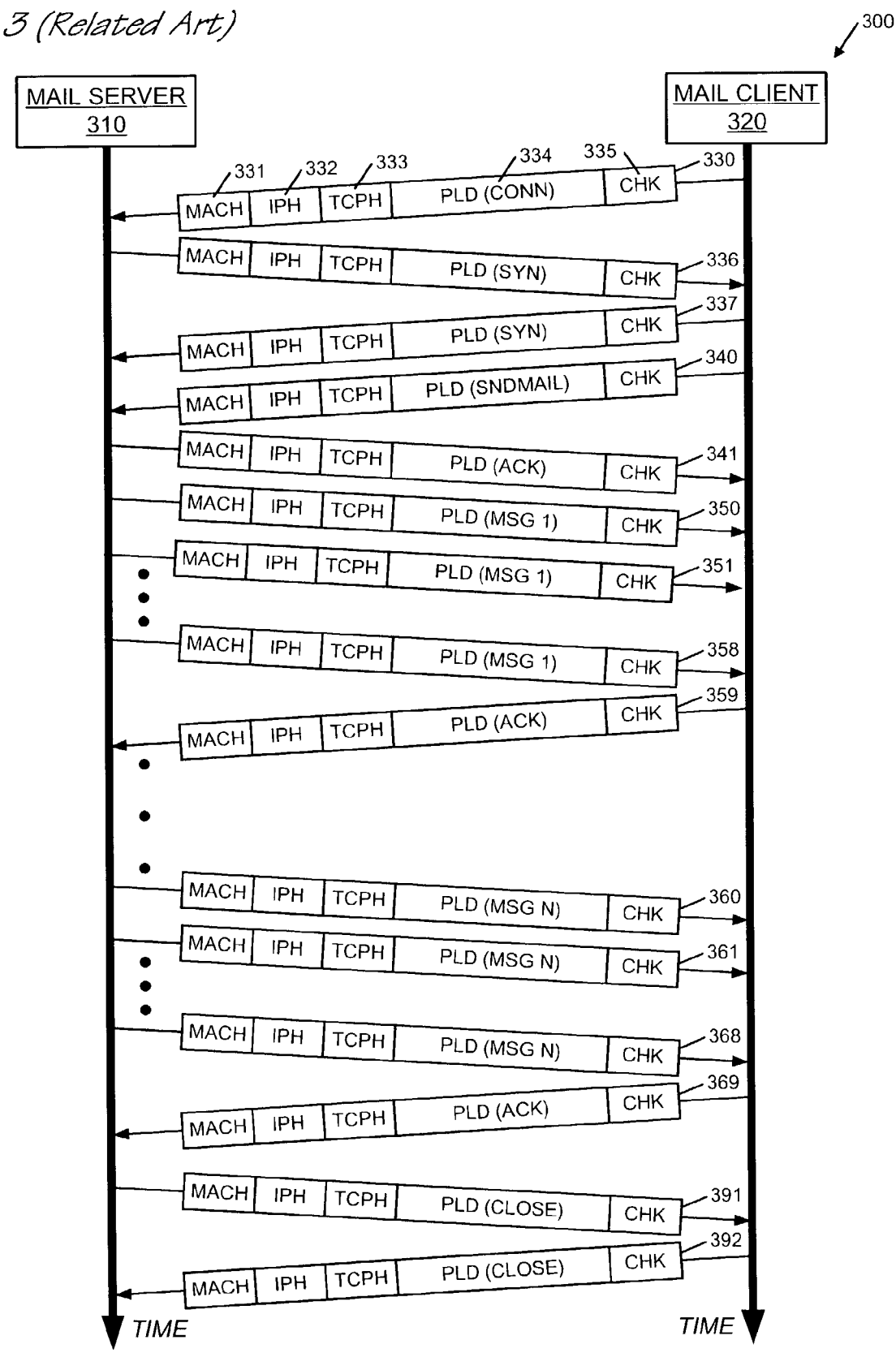
FIG. 3 is a related art timing diagram illustrating the sequence of TCP/IP network transactions that are processed by the server of FIG. 2 to carry out an exemplary client-server mail transaction.

FIG. 3 more specifically illustrates the amount of CPU processing involved for the conduct of TCP/IP transactions from the standpoint of the number of native frames that must be generated in order to perform an exemplary electronic mail transfer between a server and a client.

FIG. 3 is a related art timing diagram 300 that illustrates the sequence of TCP/IP network frames that are processed by the server of FIG. 2 to carry out an exemplary client-server mail transaction. The timing diagram 300 shows a mail server 310 that is connected to a mail client 320 within a TCP/IP communications network. The timing diagram 300 depicts representative native frames 330, 336, 337, 340, 341, 350, 351, 358–361, 368, 369, 391, 392 that are typically passed over a TCP/IP communications network 1) to establish a TCP/IP connection between the client 320 and the server 310; 2) to effect the transfer of electronic mail data from the server 310 to the client 320; and 3) to gracefully terminate the TCP/IP connection. Although the generation of specific frames and sequences of commands for a specific client-server configuration is a function of native network protocol, operating system specification, and application program constraints, one skilled in the art will appreciate that the timed sequence of frames 330, 336, 337, 340, 341, 350, 351, 358–361, 368, 369, 391, 392 presented in the diagram 300 are representative of that seen within a present day client-server electronic mail transfer.

As alluded to above, and as illustrated in native frame 330, each of the frames 330, 336, 337, 340, 341, 350, 351, 358–361, 368, 369, 391, 392 comprises a TCP payload field 334, a TCP header 333, an IP header 332, and a MAC header 331. In addition, since many native protocols also provide for error detection on a frame-by-frame basis, a checksum field 335 is also depicted that contains frame error detection data so that a receiving NIC can detect errors that occur during transmission.

To initiate a TCP/IP connection, the client 320 initially transmits frame 330 to the server 310. Within frame 330, the payload 334 contains a request to connect to the mail server application. The TCP header 333 contains the server TCP port number for the connection (typically a well-known TCP port number for mail transactions) and other parameters to describe the type of connection that is desired. The IP header 332 contains the IP address of the mail server 310 as a destination and contains the IP address of the client 320 as a source, thus providing the server with a return IP address for IP packets. The MAC header 331 contains source and destination MAC addresses that are modified along the path of transmission as the frame traverses the Internet from network to network. When the frame 330 finally reaches the server's local network, the MAC header 331 will be modified to contain the destination MAC address of the mail server's NIC.

Once the server 310 has performed the functions corresponding to frame/packet/datagram reception within each of its MAC/IP/TCP processing layers, the connection request in payload 334 is copied to the message reception buffer of the mail server application program. The application program, in granting the connection request, establishes a socket for communications with the client as described above. Through this socket, the mail program sends a synchronization acknowledgement to the client granting the connection. The synchronization acknowledgement is embedded within the payload field of frame 336. When frame 336 is received by the client 320, the client establishes a corresponding socket for the mail transaction with the server 310 and generates a synchronization acknowledgement that is transmitted to the server 310 within the payload field of frame 337, thus completing a three-way handshake. At this point, a TCP/IP connection has been established between the client 320 and the server 310.

Following establishment of the connection, the client 320 issues a send mail request embedded as the payload of frame 340. The send mail request is processed up the TCP/IP stack of the server 310 and provided to the mail program. The mail program receives the request and designates corresponding memory buffers that contain mail data to be transmitted to the client 320. A corresponding acknowledgement frame 341 is sent to the client 320 by the server 310.

To send the electronic mail data that is contained within the designated memory buffers to the client, the application program issues a send command to the TCP layer. The send command contains a pointer to the designated memory locations. At this point, the application program waits for a notification from the TCP layer that the data has been received by the client. But as FIG. 3 illustrates, the ensuing frames 350, 351, 358, 359, 360, 361, 368, 369 that are passed between the server 310 and the client 320 to effect delivery of the data involve a significant amount of TCP/IP-related processing on the server CPU's behalf. More specifically, assuming there are N electronic mail messages contained within the designated memory locations, as a function of the amount of data contained within the designated memory locations, the N messages may require decomposition at each successive TCP/IP/MAC layer resulting in the generation of perhaps tens of TCP datagrams, hundreds of IP packets, and thousands of native frames 350, 351, 358, 360, 361, 368 for transmission from the server 310 to the client 320. In addition to processing datagrams/packets/frames for transmission to the client 310, the server 310 must process acknowledgement frames 359, 369 that are received from the client 320 indicating reception of message data.

After the final frame 368 of message N has been transmitted and an acknowledgement frame 369 has been received, the TCP layer notifies the server application program that all of the mail messages in the message buffers have been sent. At this point, the server application program issues a send command to TCP containing a close connection request, which results in transmission of frame 391 to the client 320. The client responds with frame 392 containing its close request, thus gracefully terminating the TCP/IP connection.

The frame structure, TCP requests, and application program commands that have been presented in the timing diagram 300 have been provided in simplified terms in order to illustrate the essential transactions of a server-client mail transfer without encumbering the reader with details associated with a specific mail server application program, operating system, or network interface. One skilled in the art will acknowledge that the transactions presented in FIG. 3 are representative of those essential transactions required for the transfer of electronic mail messages in virtually any present day TCP/IP-enabled mail server. Furthermore, one skilled in the art will appreciate that although the example of FIG. 3 relates to the delivery of electronic mail messages to a client, the frames 340, 341, 350, 351, 358, 359, 360, 361, 368, 369 not associated with establishment and termination of the TCP/IP connection itself are indeed representative of any type of data transfer between a server and a client.

The present inventors have observed that there is an inordinate amount of TCP/IP/MAC-related processing that servers must perform in order to accomplish their primary function, namely, the transfer of service result data to a client. One disadvantage of the layered nature of TCP/IP transactions is that dedicated CPU processing is required to perform functions at each layer of the TCP/IP model, even to transfer a very small amount of data. To transfer large amounts of data to a client requires a proportional increase in frame/packet/datagram processing. Add to this the fact that today's server farms do not routinely conduct transactions with a single client; they serve thousands of clients, therefore leading one skilled in the art to infer that one of the bottlenecks in a present day server is TCP/IP-related processing. And when faced with an increasing demand for services, the options at present are grim for a server system designer, because TCP/IP functions—as well as functions required for all other forms of system I/O—are presently tightly coupled to both the CPU within a server.

The present invention overcomes the limitations and problems associated with conventional TCP/IP servers and networking equipment by providing an apparatus and method that exploit the capabilities of an emerging I/O subsystem enabling technology known as the Infiniband™ Architecture (IBA). A consortium of developers and manufacturers within the computing industry are developing the Infiniband Architecture to provide a common I/O specification for a channel based, switched-fabric I/O subsystem that can become a standard for I/O subsystem designs. One of the attractive characteristics of the IBA is that it exhibits scalable performance that is independent of a particular CPU or operating system.

The IBA employs extent switched-fabric, point-to-point interconnect technologies within the context of the I/O subsystem of a computer. Recall from the discussion with reference to FIG. 2 that a present day server typically utilizes a bussed I/O subsystem architecture (e.g., a PCI bus 252 is shown interconnecting the I/O subsystem in FIG. 2). Bussed architectures were adequate in former years when it was not anticipated that a server's I/O subsystem requirements would grow past the boundaries of its mechanical package. As I/O requirements have exponentially increased in more recent years however, system designers have been forced to provide workarounds, such as routing short I/O bus cables from a server to another mechanical package close by, where the cable allows the server's I/O bus to control, say, a number of additional hard disks, tape drives, or other forms of storage I/O. And although the processing requirements for more general types of I/O were not specifically discussed with reference to FIG. 2, one skilled in the art will acknowledge that the processing associated with general I/O functions, like that associated with TCP/IP transactions, is CPU-intensive as well. The IBA solves problems associated with processing burdens, scalability, reliable transmission of data, and I/O subsystem manageability by substituting the high-speed, switched-fabric architecture of Infiniband for the what is now a slow, growth-constrained, bus structure.

It is anticipated that I/O subsystem designs will eventually migrate from legacy I/O architectures like PCI and PCI-X to the Infiniband Architecture. At present, the IBA is prescribed by the following references: *Infiniband™ Architecture Specification Volume I*, Release 1.0; and *Infiniband™ Architecture Specification Volume II*, Release 1.0; both dated Oct. 24, 2000, and distributed by the Infiniband*SM* Trade Association, and which are incorporated by reference herein for all purposes. *Volume I* specifies the core architecture and *Volume II* specifies the electrical and mechanical configurations of the IBA. For an in-depth discussion of the IBA, the reader is referred to the above-cited documents. The discussion herein presents the IBA specifically in the context of a description of the present invention.

IBA point-to-point connections are based upon a transmission speed of 2.5 Gigabit/second (Gb/s) with options for link speeds up to 30 Gb/s. In addition to transmission speed options, performance scalability is also provided for through the use of parallel link connections. The IBA supports both copper based and fiber-based link technologies.

Initially, IBA technology will be used to interconnect servers and to connect servers with remote storage devices. And it is expected that I/O system architectures in new computer designs will transition from the legacy bus structures of today to the switched-fabric architecture provided by IBA. In light of the data movement and scalability advantages provided by a switched-fabric I/O architecture, it is very likely that a rapid graceful migration would take place, but this scenario is only applicable within in an environment that does not consider the real costs of migration. Indeed, the reality is that most businesses today have fostered a significant investment in the equipment, software, and infrastructure associated with TCP/IP client-server environments, so much so that it will take years, if ever, to complete migration to an IBA-based I/O subsystem world. The present inventors predict that the transition to an IBA-based client-server environment, like transitions associated with prior technology advances, will begin in the data center because 1) data centers have the greatest need for the movement of I/O data, 2) they have the expertise to support the introduction of a new technology, and 3) they typically possess the lion's share of a company's information technology budget.

While it is reasonably certain that data center designs will eventually switch to IBA, the primary motivation for doing so will be to provide interconnectivity to additional storage devices. Consequently, the equipment and infrastructure associated with existing TCP/IP-based client networks will remain fixed for a long time, as well as the suite of client-server application programs that rely upon the presence of TCP/IP. Therefore, the present invention is provided to enable clients on a TCP/IP-based network to effectively interconnect with legacy server applications by exploiting the switched fabric advantages of the IBA. In addition to enhancing the sheer movement of data within a data center, the present invention takes advantage of inherent IBA characteristics to enable servers within the data center to offload most of their TCP/IP processing functions. The present invention is more completely described with reference to FIGS. 4–12.

Figure 4:
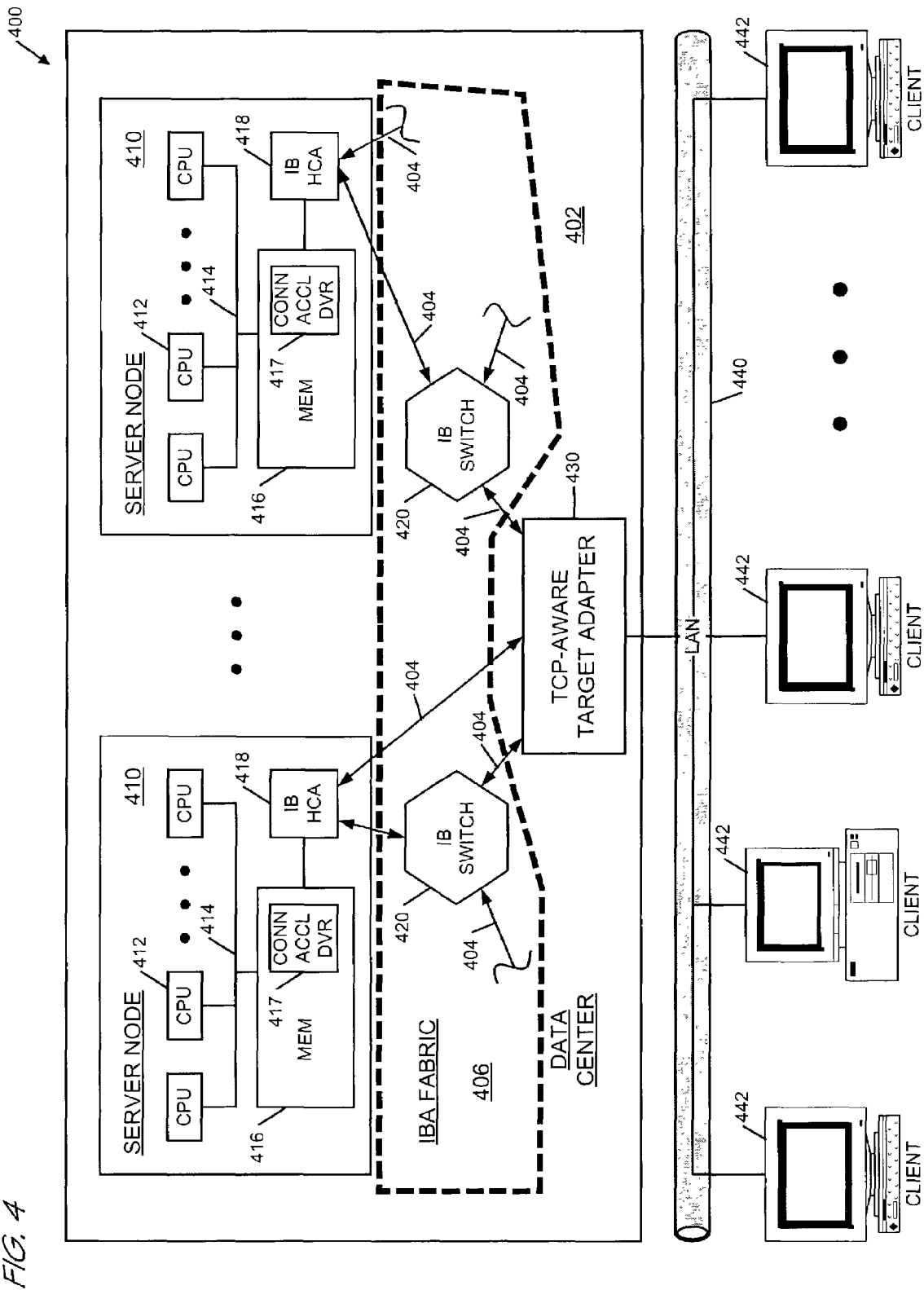
FIG. 4 is a block diagram featuring a system according to the present invention for accelerating client-server TCP/IP connections over an Infiniband Architecture network subsystem.

Referring to FIG. 4, a block diagram is provided featuring a system 400 according to the present invention for accelerating client-server TCP/IP connections over an Infiniband Architecture network subsystem. The system 400 includes one or more servers 410 that are located within a data center 402. The servers 410 are interconnected over a data center point-to-point IBA fabric 404 via Infiniband host channel adapters (HCAs) 418. Within an IBA environment, the HCAs 418 serve the function of interfacing the servers 410 to the Infiniband fabric 406, very much like the role played by network interface cards within a TCP/IP local area network environment. But in contrast to devices providing access to a TCP/IP-based local area network, the HCAs 418 within an IBA-based I/O subsystem are entirely responsible for performing transport services and network routing services, as well as data link layer services. What this means is that CPU's 412 within a server 410 are no longer burdened with the processing associated with intermediate-level and lower-level layers of a particular communications protocol. In fact, an Infiniband HCA 418 interfaces directly to a server's memory 416 as opposed to interfacing to a CPU via a host bus 414. Infiniband message transactions are requested by applications within the server 410. And once a transaction request has been provided to an IBA HCA 418, the HCA completes the requested transaction—independent of the CPUs 412.

Since the IBA is a point-to-point architecture, the fabric 406 comprises a number of point-to-point links 404 and cascaded switches 420 that interconnect end nodes 410, 430. The links 404 can be copper-based or fiber-based and transactions over the fabric 406 consist of a sequence of addressed packets. Switches route the packets from a source end node, designated by a source local identifier (SLID) within a packet, to a destination end node, designated by a destination local identifier (DLID) within the packet. Infiniband packetized transactions are very similar to TCP/IP transactions in that source and destination addresses are employed within packets, but the fundamental differences between these two technologies lie in the fact that an IB HCA 418 is the element which is entirely responsible for delivery of messages from one end node to the next. Once an application within a server 410 has requested that an IBA message be sent, the server's CPU 412 is free to perform other functions. The HCA 418 accesses the message data directly from memory 416 and completes transmission of the message.

In an environment that has fully migrated to this new I/O subsystem technology, all servers 410 and clients 442 would be interconnected over the IB fabric 406. But as is noted above, it is probable that migration of the client environment to the IBA will be slow at best. Hence, the block diagram also depicts a number of clients 442 that are interconnected over a TCP/IP-based client LAN 440. Accordingly, the client LAN 440 may employ one of the native network protocols discussed with reference to FIG. 1, to include Ethernet, Wireless Ethernet, Fiber Distributed Data Interconnect (FDDI), Attached Resource Computer Network (ARCNET), Synchronous Optical Network (SONET), Asynchronous Transfer Mode (ATM), and Token Ring. To provide interface of the IBA-based servers 410 to the TCP/IP-based clients 442, the system 400 according to the present invention includes a TCP-aware target adapter 430 that is connected both to the IBA fabric 406 and the TCP/IP-based client LAN 440. In addition, a TCP/IP connection acceleration driver 417 is provided within each of the servers 410 to interface TCP/IP-based server applications to the IBA HCAs 418.

In operation, the connection acceleration driver 417 within a server 410 intercepts commands that are provided to the server's TCP/IP stack from TCP/IP-based application programs. For client-server TCP/IP connections that have been established and designated by the TCP-aware target adapter 430 as accelerated TCP/IP connections, the connection acceleration driver 417 utilizes data from the established socket and the socket command to determine the memory location of message data in memory 416. The connection acceleration driver 417 then causes the HCA 418 to issue an IBA packet to the TCP-aware target adapter 430 designating that the message data is available for retrieval from the memory location. The TCP-aware target adapter 430, in turn, sends the HCA 418 an IBA packet containing a request for a remote direct memory access (RDMA) read of the memory location. The IBA, by specification, provides an HCA 418 with the ability to directly perform DMAs on a server's memory 416, thus enabling the HCA 418 to retrieve the message data from the memory location without intervention by the CPU 412. The HCA 418 transmits the message data within IBA packets to the TCP-aware target adapter 430. And the TCP-aware target adapter 430 performs the TCP/IP/MAC processing required to transmit the message data to the designated client 442 in accordance with the native network protocol employed by the client LAN 440. The TCP/IP stack processing for accelerated client-server connections is provided for by the TCP-aware target adapter 430, thus offloading the server CPU 412. In addition to freeing up the server's CPU, the ability of the IBA fabric 406 to rapidly move data in and out of a server's memory 416 enables servers within a data center 402 to respond to significantly more service requests than has heretofore been provided. Infiniband communications are much faster than TCP/IP-based communications because the IBA fabric is a point-to-point switched medium as opposed to a shared medium. In addition, the IBA protocol is a single-layer as opposed to the multiple-layer TCP/IP protocol. Furthermore, the Infiniband architecture provides for the transfer of data directly to/from memory as opposed to the buffering scheme of TCP/IP. These are only a few of the reasons that IBA is now being preferred over other protocols for the rapid movement of data over an I/O subsystem.

For unaccelerated client-server connections, the connection acceleration driver 417 allows TCP/IP commands from an application program to be processed by the server's TCP/IP stack. At the bottom of the stack, the driver 417 retrieves the resulting native frame data according to the operating system's network driver interface (NDI). The connection acceleration driver 417 then generates and provides IBA transaction requests to the HCA 418 resulting in the transmission of IBA packets to the TCP-aware target adapter 430. The payload of the IBA packets contain the native network frame data that was retrieved via the NDI for transmission to a designated client 442. The TCP-aware target adapter 430 receives the IBA packets from the IBA fabric 406 and generates native network frames over the client LAN 440 to a designated client 442. For native TCP/IP transactions from the designated client 442 to the server 410, the TCP-aware target adapter 430 receives the native frames and embeds native frame data into IBA packets which are transmitted over the fabric 406 to the HCA 418 within the server 410. The connection acceleration driver 417 retrieves the native frames data and provides it to the server's TCP/IP stack at the NDI.

In one embodiment, an unaccelerated client-server connection is a TCP/IP connection that has not yet been established and accelerated or it is an established and accelerated connection that is in the process of graceful termination. Established client-server connections are accelerated in order to move message data between clients 442 and servers 410, thereby offloading host TCP/IP processing. Unaccelerated connections are employed to gracefully establish and terminate TCP/IP sessions between clients 442 and servers 410.

The TCP-aware target adapter 430 is primarily responsible for performing TCP/IP/MAC processing associated with the generation and routing of native network frames to the clients 442. Accordingly, the TCP-aware target adapter 430 provides the MAC address of the designated client's NIC (not shown) along with all of the other data fields describing the connection within a native network transaction. In addition to processing and routing native network frames, the TCP-aware target adapter 430 is well-suited to perform other data center functions as well. Such functions include, but are not limited to load balancing, firewall functions, IP security offload functions, generalized sharing of MAC addresses, and routing of transactions to a backup server in the case of primary server failure (i.e., fail-over functions).

Figure 5:
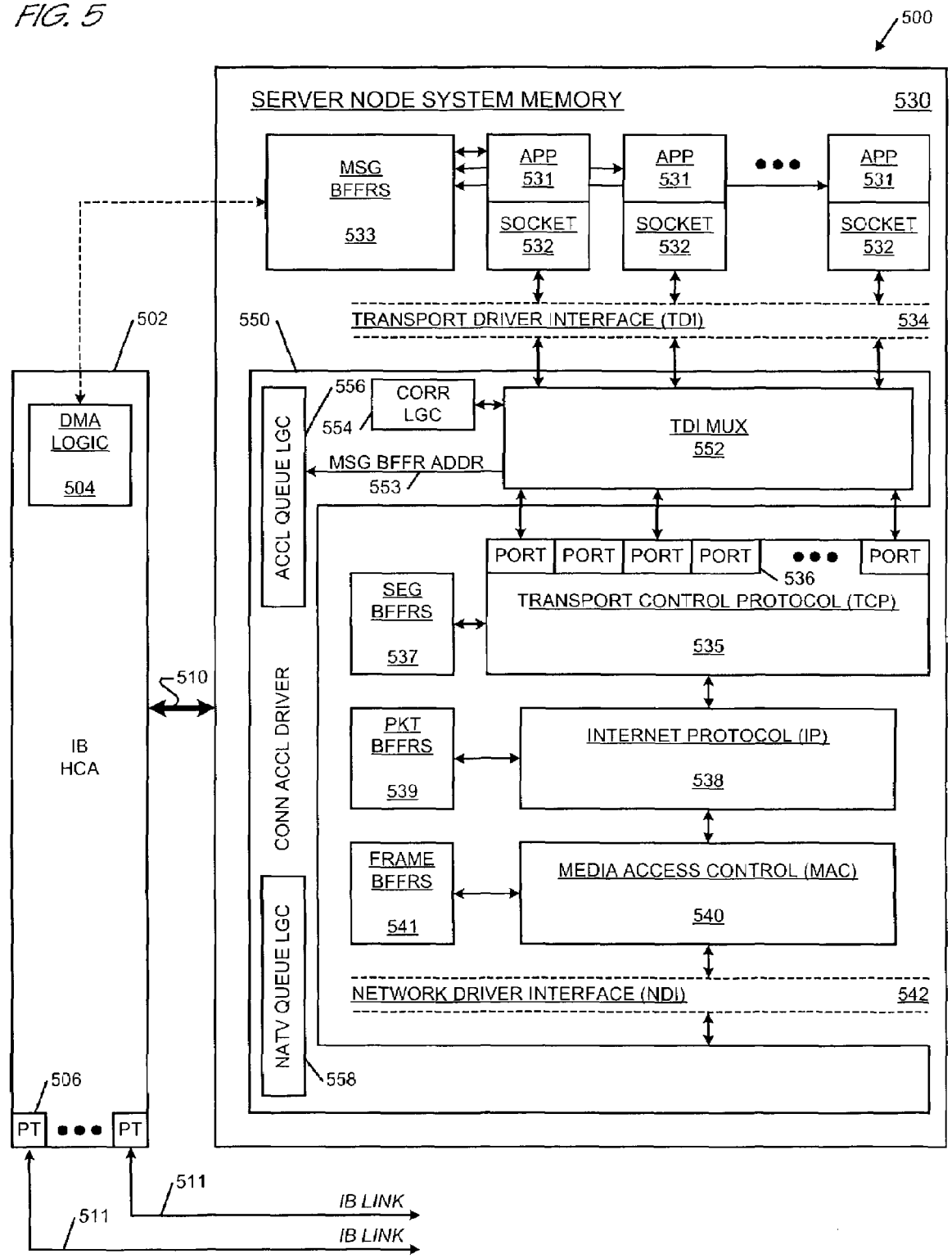
FIG. 5 is a block diagram showing details of a server node according to the present invention.

Now referring to FIG. 5, a block diagram is presented showing details of a server node 500 according to the present invention. The server node 500 has an IBA host channel adapter (HCA) 502 that is connected to system memory 530 via a host bus 510. Although not shown in the block diagram, the server node 500 also has one or more CPUs that are connected to the host bus 510 as well. In contrast to the server architecture discussed with reference to FIG. 3 however, access to all I/O devices within the server 500 according to the present invention is gained via the HCA 502. Unlike a present day server that relies upon its CPU to manage connectivity to system I/O devices, I/O connectivity below the application program level is provided for via the HCA 502. The HCA 506 includes DMA logic 504 that allows the HCA 502 to perform DMAs to/from system memory 530. The HCA 502 also has one or more IBA ports 506 that are each connected to a corresponding IBA link 511. IBA packets are routed over a specific link 511 based upon the destination address within the packets that identifies the destination node.

Configuration of system memory 530 according to the present invention is like configuration of system memory in a conventional TCP/IP-based server, with the exception that memory 530 according to the present invention includes a connection acceleration driver 550. In one embodiment, the driver 550 has a transport driver interface (TDI) mux 552 that is coupled to a server's TCP/IP stack at the operating system's transport driver interface (TDI) 534 and at its network driver interface (NDI) 542. The connection acceleration driver also has accelerated queue logic 556 and native queue logic 558. The TDI mux 552 interfaces to correlation logic 554 and also to the accelerated queue logic 556 via bus 553.

The system memory 530 also includes one or more application programs 531, each of which are coupled to corresponding message buffers 533. The message buffers 533 contain data to be transmitted via TCP/IP transactions or they designate memory locations 533 into which TCP/IP transaction data is to be received. For TCP/IP transactions, the application programs 231 generate sockets 532 that interface to a the connection acceleration driver 550 via the TDI 534. Consequently, from the view of an application program 531 and its socket 532, send and receive commands are essentially being issued to a TCP processing module 535 of the operating system via one of a number of TCP ports 536. But what really occurs is that these commands are being intercepted by the TDI mux 552. Only commands corresponding to unaccelerated TCP/IP connections are routed to the TCP processing module 535. Accelerated TCP/IP connections are processed by the connection acceleration driver 550.

The server node 500 also includes remaining elements of a conventional TCP/IP stack similar to those like-named elements described with reference to FIG. 2 to include TCP segment buffers 537, an IP processing module 238, IP packet buffers 239, a MAC processing module 240, and a corresponding set of native frame buffers 241. Hence, for unaccelerated connections, all native transaction processing, as well as processing of IP packets, TCP datagrams, and application program messages, is performed by the server's CPU.

Operationally, to carry out a TCP/IP transaction between an application program 531 on the server and a corresponding client application, the server application 531 first designates message buffers 533 for the transmission and reception of transaction data. During the establishment of a TCP/IP connection with the client, the TDI mux 552 allows connect commands to fall through to the TCP module 535, and hence through the IP module 538 and MAC module 540. The driver 550 then retrieves native frame data for the connection commands via the NDI 542 and embeds these native frames into Infiniband packets for transmission to a TCP-aware target adapter according to the present invention (not shown). The IBA transmission requests are queued for transmission by the HCA 502 via the native queue logic 558. The HCA 502 thus transmits the packets to the TCP-aware target adapter for delivery to a designated client. Connection responses from the designated client are handled by the connection acceleration driver 550 in like manner via the native queue 558.

Once the parameters of a TCP/IP connection have been established (i.e., the socket 532 parameters have been agreed upon between the server application program 531 and the client application program), when the host application 531 initiates transfer of transaction data to the designated client application by issuing a "send" command to the operating system, the acceleration driver 550 issues a connection acceleration request to the TCP-aware target adapter that supplies all of the negotiated TCP/IP connection parameters along with memory addresses of applicable message buffers 533. If acceleration of the connection is granted by the target adapter, then the target adapter sends a remote direct memory access (RDMA) read command to the HCA 502 designating the memory addresses of the applicable message buffers 533. Accordingly, the DMA logic 504 reads the message data from the applicable message buffers 533 and provides the data to the TCP-aware target adapter in an RDMA response, thus bypassing the server's TCP/IP stack. The target adapter then performs all of the TCP/IP/MAC processing that is required to deliver the message data to the designated client over a native client LAN. All subsequent message data is transferred between the server and the client via the accelerated connection, until such time that the connection is terminated. For connection termination, the TDI mux 552 allows termination close commands and responses to be processed by the TCP/IP/MAC processing modules 535, 538, 540 so that they can gracefully terminate.

The correlation logic 554 provides correlation between the server node's native/IP addresses and a native frame path parameters through the native queue logic 558. In addition, the correlation logic 554 provides a mapping of the accelerated TCP/IP connection parameters and an accelerated data path through the accelerated queue logic 556. For accelerated connections, bus 553 enables the TDI mux 552 to provide the accelerated queue logic 556 with locations of applicable message buffers 553.

Native transaction paths in the server's native queue 558 are established upon initialization so that native transactions can occur. Accelerated connection paths in the accelerated queue 556 are dynamically established and torn down as required by server workload. In one embodiment, each accelerated connection is established via a unique set of acceleration request/response messages between the server 500 and the TCP-aware target adapter. In an alternative embodiment, a plurality of accelerated connections are implemented by a single request/response message. In an intelligent target driver embodiment, the TCP-aware target adapter controls the number and extent of accelerated connections allowed and data transfer from the server 500 is effected via RDMA read operations. Data transfer to the server 500 is accomplished via RDMA write operations. In a server-priority embodiment, the server 500 controls the number and extent of accelerated connections that are allowed.

From the standpoint of the server's operating system, an accelerated connection is experienced as a TCP/IP connection that is established and terminated without any transfer of data. From the standpoint of the server application program 531, an accelerated connection is experienced as a normal TCP/IP connection that rapidly accomplishes the transfer of data to/from a client application. From the standpoint of a CPU within the server 500, the accelerated connection an operation that is completely offloaded such that the CPU can service additional client requests.

Figure 6:
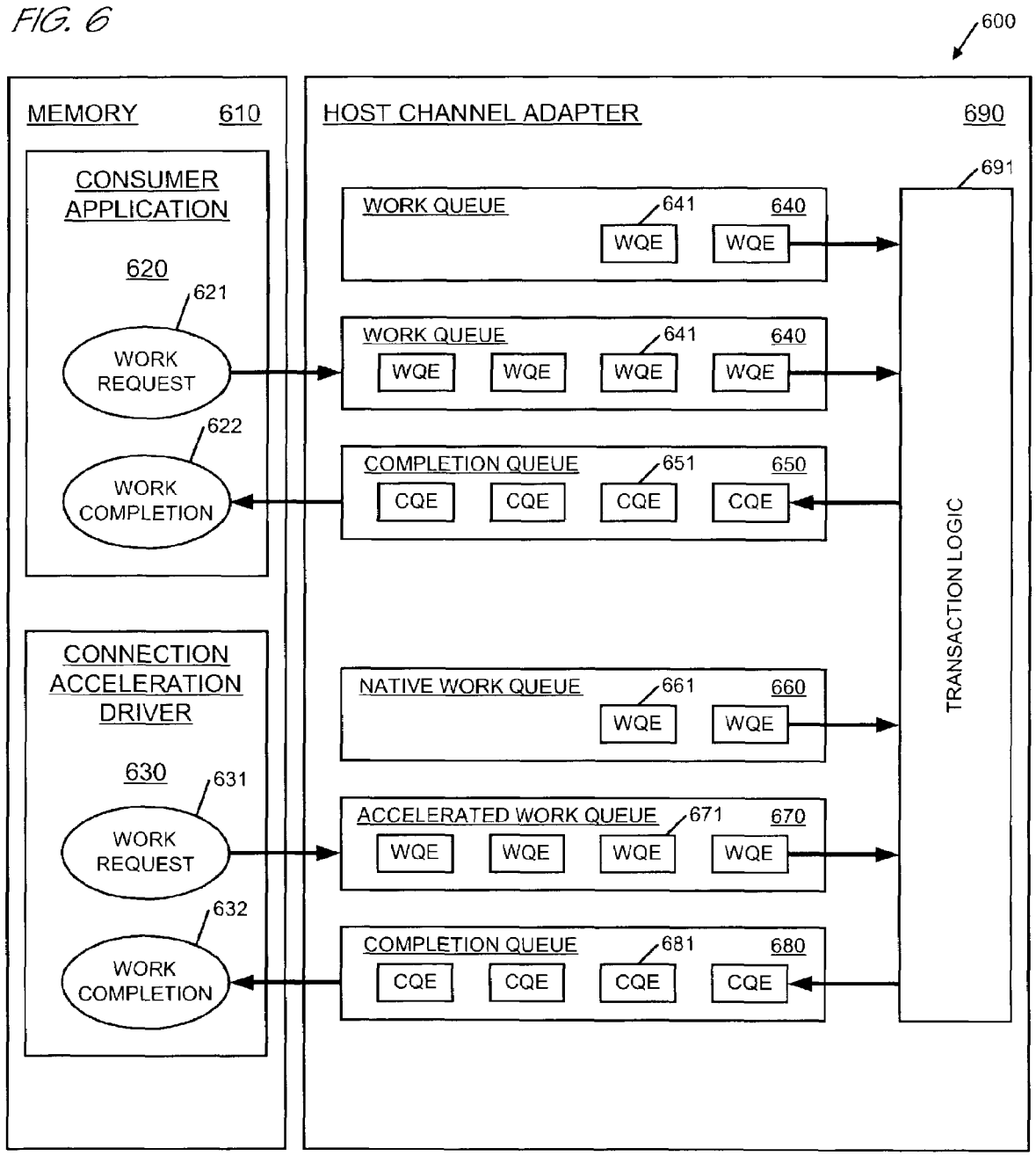
FIG. 6 is a diagram illustrating the employment of Infiniband work queues according to the present invention to support both native and accelerated TCP/IP client-server connections.

Referring now to FIG. 6, a diagram 600 is presented illustrating the employment of Infiniband work queues 640, 660, 670 according to the present invention to support both native and accelerated TCP/IP client-server connections. A work queue 640, 660, 670, is the IBA facility through which an application 620, 630 provides instructions that cause data to be transferred between the application's memory and another application's memory. Within the IBA, applications 620, 630 are referred to as consumers 620, 630. The diagram 600 depicts two consumers 620, 630 within host memory 610: a consumer application 620 of unspecified function and a connection acceleration driver 630 in accordance with the present invention. An IBA consumer 620, 630 may have one or more corresponding work queues 640, 660, 670. The diagram 600 also depicts completion queues 650, 680 that correspond to each of the consumer applications 620, 630. A completion queue 650, 680 is the IBA facility through which a consumer 620, 630 receives confirmation from that requested operations have been accomplished. The diagram 600 depicts the work queues 640, 660, 670 and completion queues 650, 680 within a host channel adapters 690 that is part of a server according to the present invention. Transaction logic 691 within the host adapter 690 is coupled to each of the work queues 640, 660, 670 and completion queues 650, 680.

Operationally, Infiniband operations are invoked by a consumer 620, 630 through the generation of a work request 621, 631. A consumer 620, 630 receives confirmation that an Infiniband operation has been completed by receipt of a work completion 622, 632. Work requests 621, 631 and work completions 622, 632 are generated and received via the execution of IBA Verbs. Verbs are analogous to socket calls that are executed in a TCP/IP-based architecture. To direct the transfer of data from consumer memory 610, the consumer 620, 630 executes a work request verb that causes a work request 621, 631 to be provided to the host channel adapter 690. The channel adapter 690 receives the work request 621, 631 and places a corresponding work queue element 641, 661, 671 within the work queue 640, 660, 670 that is designated by the work request 621, 631. The transaction logic 691 executes work queue elements 641, 661, 671 in the order that they are provided to a work queue 640, 660, 670 resulting in transactions over the IBA fabric. As transactions are completed, the transaction logic 691 places completion queue elements 651, 681 on completion queues 650, 680 that correspond to the completed transactions. The completion queue elements 651, 681 are thus provided to corresponding consumers 620, 630 in the form of a work completion 622, 632 through the verbs interface.

FIG. 6 depicts the connection acceleration driver 630 executing in memory 610 along with another application 620. The other application 620 has established two work queues 640 and a completion queue 650. The diagram 600 portrays the issuance of a work request 621 to one of the work queues 640 and the receipt of a work completion 622 from the application's completion queue 650. In addition, the transaction logic 691 is executing Infiniband operations in response to work queue elements 641 from both of the application's work queues 640. The transaction logic 691 is also placing completion queue elements on the application's completion queue 650.

In a more specific sense regarding the present invention, FIG. 6, also portrays that the connection acceleration driver 630 has established a native transaction work queue 660, an accelerated transaction work queue 670, and a completion queue 650. An accelerated transaction work request 631 is being provided to the accelerated work queue while a work completion 632 is being received from the driver's completion queue 680. In addition, the transaction logic 691 is executing both native and accelerated Infiniband operations in response to native and accelerated work queue elements 661, 671. As native and accelerated transactions are completed, the transaction logic 691 places completion queue elements on the connection acceleration driver's completion queue 680.

FIG. 6 provides a high-level representation of queue structures 660, 670, 680 corresponding to the present invention to illustrate how native and accelerated connections are accomplished. In one embodiment, the driver 630 creates and maintains separate work queues for each native network that is serviced by a host. And since no actual native network is interfaced to the host, the host may be configured to service a number of different client networks and/or native protocols. In one embodiment, native queues 660 could are established within the same host to service a combination of network protocols, say, both an Ethernet network and an FDDI network. An accelerated work queues 670 is established for each accelerated TCP/IP connection that has been granted, hence the maximum number of accelerated work queues that can be established is a function of server processing capacity and constraints of the host channel adapter. For each accelerated work queue 670 within a host, a corresponding accelerated target work queue exists within a TCP-aware target adapter according to the present invention.

Figure 7:
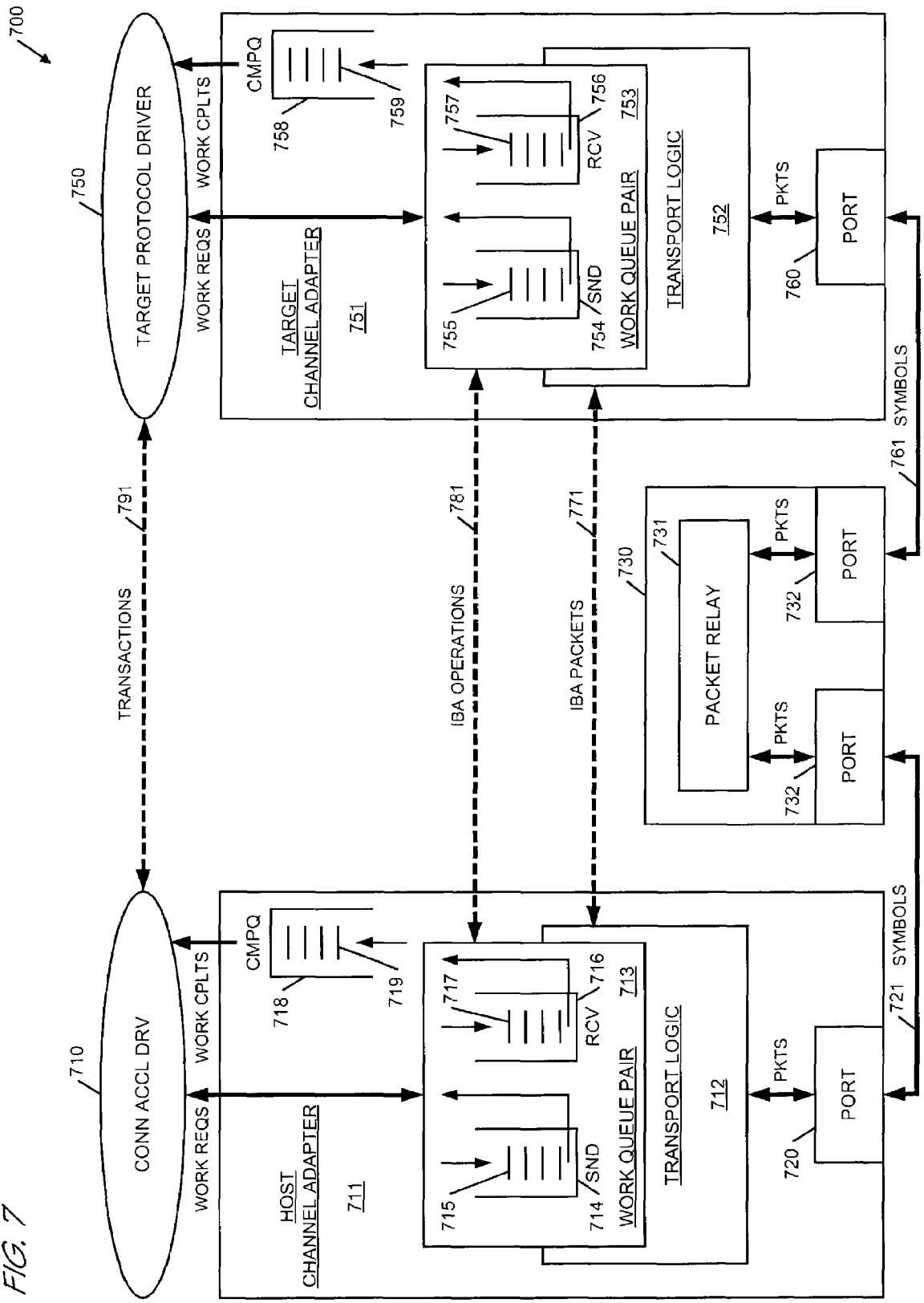
FIG. 7 is a diagram depicting a layered architecture according to the present invention for executing accelerated TCP/IP transactions between a host and a TCP-aware target adapter.

Now referring to FIG. 7, a diagram 700 is presented depicting a layered architecture according to the present invention for executing accelerated TCP/IP transactions between a host and a TCP-aware target adapter. The diagram shows a connection acceleration driver 710 within a server according to the present invention that is interfaced over an IBA fabric to a target protocol driver application 750 executing within a TCP-aware target adapter according to the present invention. The connection acceleration driver 710 issues work requests and receives work completions to an IBA host channel adapter 711 within the server. The target protocol driver 750 issues work requests and receives work completions to an IBA target channel adapter 751 within the TCP-aware target. For an accelerated connection between the host and a designated client, each of the channel adapters 711, 751 have established a corresponding set of work queues 713, 753 through which IBA packets will be generated to transfer data to/from the server from/to the designated client. Each of the work queues 713, 753 have a send queue 714, 754 and a receive queue 716, 756. The send queue 714, 754 contains send queue elements 715, 755 that direct Infiniband operations to be sent to the corresponding work queue 753, 713. The receive queue 716, 756 contain receive queue elements 717, 757 that specify memory locations to which data received from a corresponding application 710, 750 is stored. Each of the channel adapters 711, 751 provide work completion to their respective drivers 710, 750 via a completion queue 718, 758. Each of the work queue pairs 713, 753 within the channel adapters 711, 751 are interfaced to IBA transport logic 712, 752. The transport logic 712, 752 processes the work queue elements 715, 717, 755, 757. For work queue elements 715, 755 that direct transmission of IBA packets, the transport logic 712, 752 generates those packets and provides them to a corresponding IBA port 720, 760 on the channel adapter 711, 751. The port 720, 760 converts the packet to a serial stream of IBA symbols and transmits the symbols over a corresponding link 721, 761.

A switch 730 is shown in the diagram 700 that is configured to route packets from the host adapter 711 to the target adapter 751. The switch 730 includes ports 732 and packet relay logic 731. The switch 730 receives packets from one of the ports 732 and the packet relay logic 731 reads destination address information from the packet in order to select a port 732 over which to relay the packet to its destination channel adapter 711, 751. Although only two ports 732 are shown in the switch 730, one skilled in the art will appreciate that a typical switch 730 will have several ports 732 and the packet relay logic 731 is configured to select the appropriate port 732 over which to route packets in accordance with topology of the fabric.

In an architectural sense, FIG. 7 depicts how all layers of a transaction according to the present invention are provided for by IBA hardware rather than a server's CPU. Physical layer symbols are transmitted over IBA links 721, 761. Data link layer processing is accomplished via ports 720, 732, 760 within switches 730 on the fabric or end node channel adapters 711, 751. Transport logic 712, 752 ensures that packets are routed (i.e., network layer) to their proper destination node. End-to-end delivery (i.e., transport layer) of IBA operations contained within the packets is provided for through the employment of associated work queues 713, 753. Operations provided in corresponding work queues 713, 753 result in data being moved to/from the memory of connected applications 710, 750.

Figure 8:
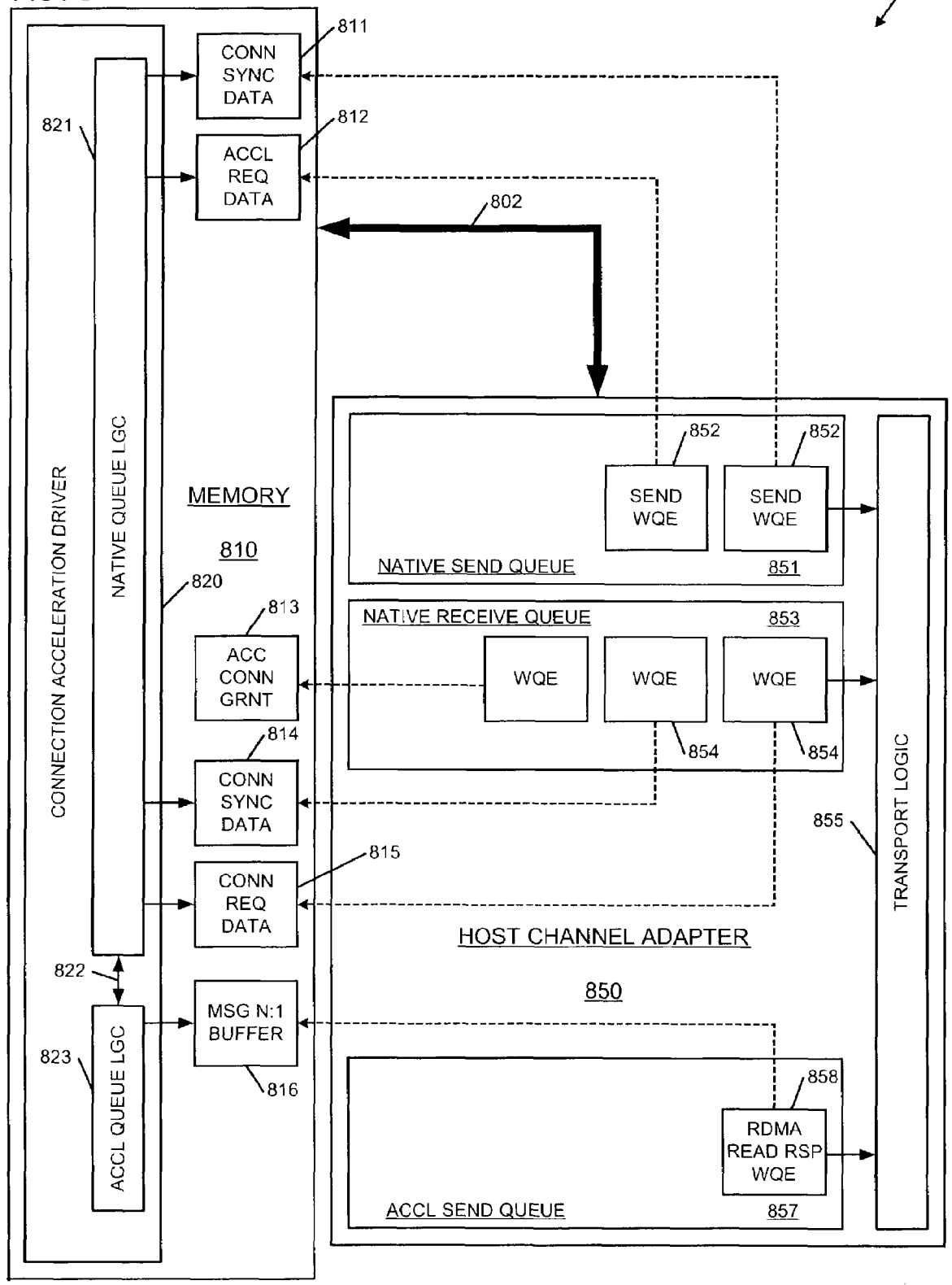
FIG. 8 is a block diagram showing how a connection acceleration driver within a server according to the present invention implements an accelerated TCP/IP connection to perform an exemplary client-server mail transaction.

Referring now to FIG. 8, a block diagram 800 is presented showing how a connection acceleration driver 820 within a server according to the present invention implements an accelerated TCP/IP connection to perform an exemplary client-server mail transaction. The block diagram 800 shows memory 810 within the server that is coupled to an IBA host channel adapter 850 via a host bus 802. The memory 810 includes the connection acceleration driver 820 that generates a sequence of send and receive work requests to send/receive data elements 811–816 between the server and a client. Native queue logic 821 handles a sequence of native work requests to establish an accelerated TCP/IP connection between the mail server and the client. Accelerated queue logic 823 handles accelerated work queue requests to deliver the mail data from a message buffer 816 in memory 810.

The host channel adapter 850 has a native queue pair comprising a native send queue 851 and a native receive queue 853. The host adapter 850 also has an accelerated queue pair comprising an accelerated send queue 857 and an accelerated receive queue (not shown). The accelerated queue 857 is set up when the accelerated TCP/IP connection is granted and it is torn down following transmission of the mail data 816. All of the queues 851, 853, 857 are serviced by transport logic 855 within the host channel adapter.

To establish the accelerated connection for transfer of the mail, the native queue logic 821 receives a connection request 815 from a client machine. The connection request is placed in a receive buffer memory location 815 designated by previous execution of a native receive work queue element 854. As discussed above, the acceleration driver 820 provides the connection request 815 to the server's TCP/IP stack (not shown) at the NDI (not shown). In response to the connection request 815, a mail server application (not shown) causes the native logic 821 to issue a send work request to the native send queue 851 containing a TCP/IP connection synchronization command 811 to the client. In addition, the native logic 821 issues a receive work request 854 to the native receive queue 853 designating a buffer 814, into which is received 3-way connection synchronization handshake 814 from the client. Following establishment of a native TCP/IP session between the server and the client, the native logic 821 queues an accelerated connection request 812 for transmission to a TCP-aware target adapter according to the present invention. The accelerated connection request 812 designates a buffer location 816 containing mail to be delivered to the client. An accelerated connection grant 813 is received from the target adapter via the native work queue 853 that provides a corresponding work queue number within the target adapter through which the accelerated connection will be effected. Each of these requests and responses 811–815 are provided by the native queue logic 821 in memory 810 in the form of native frame data 811–815. The native frames 811–815 are accessed when the host adapter 850 processes the associated work queue elements 852, 854 to embed the frame data into outgoing IBA packets for transmission to the TCP aware target adapter or to retrieve embedded frame data from incoming IBA packets.

In one embodiment, following establishment of the accelerated TCP/IP connection between the server and the TCP-aware target adapter, the host adapter 850 receives an RDMA read command (not shown) from the target adapter directing a remote DMA read of the message buffer 816. In response, the host adapter 850 performs the DMA and transmits the message data 816 to the target adapter as a result of an RDMA read response work queue element 858 being executed from the accelerated send queue 857. Thus, mail data 816 is rapidly transmitted to the TCP-aware target adapter through the employment of an IBA remote DMA operation. The target adapter handles subsequent TCP/IP/MAC processing to transfer the mail data 816 to the client according to the client's native network protocol. In an alternative embodiment, to transmit the mail data 816 to the client, the connection acceleration driver 820 causes a sequence of IBA send work queue elements to be executed by the host adapter 850.

Figure 9:
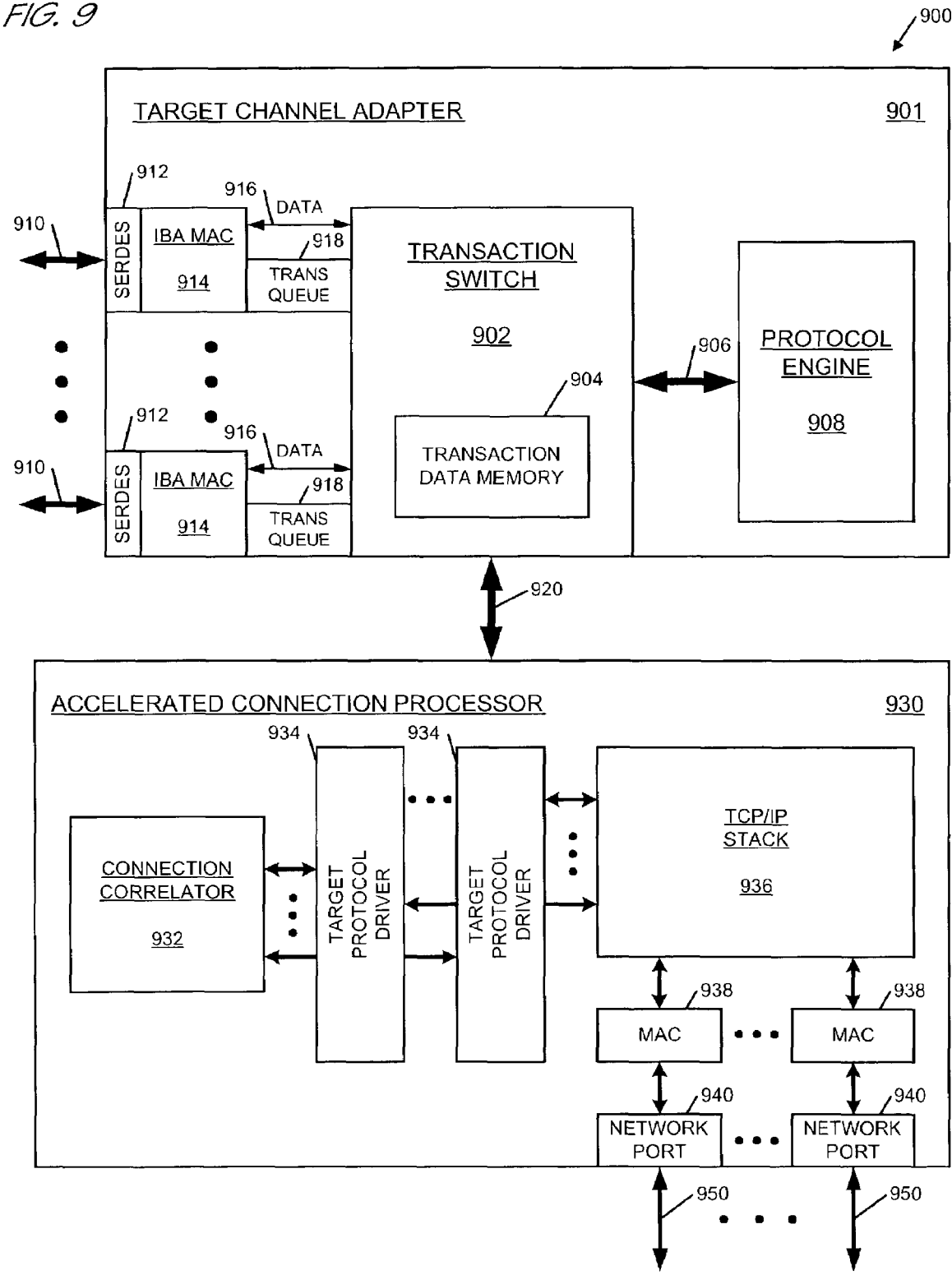
FIG. 9 is a block diagram illustrating a TCP-aware target adapter according to the present invention.

Now referring to FIG. 9, a block diagram is presented illustrating a TCP-aware target adapter 900 according to the present invention. The target adapter 900 includes an IBA target channel adapter 901 that is coupled to an accelerated connection processor 930 via bus 920. In one embodiment, both the target channel adapter 901 and the accelerated connection processor 930 exist as logic elements 901, 930 within the same integrated circuit. In an alternative embodiment, the target channel adapter 901 and the accelerated connection processor 930 are separate integrated circuits within the same circuit card assembly. In a PCI-based embodiment, bus 920 is a PCI or PCI-X bus 920. In a further alternative embodiment, the target channel adapter 901 and the accelerated connection processor 930 reside on different circuit card assemblies that are interconnected over a PCI/PCI-X bus 920.

The IBA target channel adapter 901 has a transaction switch 902 that is coupled to a plurality of IBA MAC controllers 914 via a corresponding plurality of transaction queues 918. Data is transferred between the MACs 914 and the switch 902 via a plurality of data buses 916. Each MAC 914 couples to IBA serializer-deserializer logic 912, which provides physical interface of IBA symbols to a corresponding IBA link 910. IBA transactions are provided to the transaction switch 902 through each transaction queue 918. Payload data for IBA transactions is routed via data buses 916 to transaction data memory 904 within the switch 902. The transaction switch 902 is also coupled to a protocol engine 908 via bus 906.

The accelerated connection processor 930 includes a TCP/IP stack 936 that is coupled to a plurality of native protocol MAC modules 938. Each MAC module 938 drives a corresponding native network protocol port 940. Each native port 940 is coupled to a native network medium 950. The TCP/IP stack 936 is also coupled to a plurality of target protocol drivers 934. The protocol drivers are coupled to a connection correlator 932. In one embodiment, the plurality of target protocol drivers 934, MAC modules 938, native ports 940, and network media 950 provide for TCP/IP native network frame transmission and reception in accordance with a single native network protocol. In an alternative embodiment, frame processing according to two or more native protocols is provided for by the drivers 934, MAC modules 938, ports 940, and media 950.

In operation, IBA symbols are transmitted and received over the IBA fabric 910 via the SERDES 912. The SERDES 912 are the physical connection to the IBA fabric 910. The SERDES 912 convert outgoing IBA packets into serial streams of IBA symbols and convert incoming serial streams of IBA symbols into IBA packets. The IBA MAC controllers 914 interface the SERDES 912 to the transaction switch 902. The MAC controllers 914 handle IBA link layer functions to include incoming packet buffering, packet formatting, port flow control, and packet error detection. The transaction switch 902 direct all of the transaction and data traffic between the IBA MAC controllers 914 and the protocol engine 908. The protocol engine 908 provides IBA transport services for the switch 902. Accordingly, the protocol engine 908 establishes and manages all of the IBA work queues. In one embodiment, the target channel adapter provides an IBA packet routing function as described above such that it functions as an IBA switch. IBA packets are received through one SERDES/MAC 912/914 (i.e., and IBA port) and are appropriately processed via the protocol engine 908 such that the transaction switch 902 routes the packets out of a different SERDES/MAC 912/914 that corresponds to destination addresses within the packets.

The TCP/IP stack 936 within the accelerated connection processor 930 provides conventional TCP/IP processing functions as described above. Each of the MACs 938 handle processing of outgoing IP packets and converts these packets to native network protocol frames that are output via the network ports 940. The native ports 940 interface the MAC layer 938 to the network media 950, very much like the function of a NIC in a present day server or client.

Accelerated and unaccelerated TCP/IP transaction data from the IBA fabric 910 is transferred between the target channel adapter 901 and the accelerated connection processor 930 via bus 920. Recall from the discussion with reference to FIG. 5 that all TCP/IP transaction data, regardless of whether of not a particular server client connection is accelerated, is embedded within IBA packets. Hence, incoming TCP/IP transaction data is received by the accelerated connection processor 930. The connection correlator 932 associates work queue numbers in the protocol engine 901 with native/accelerated TCP/IP connection parameters, thus enabling the transaction data to be processed by the appropriate target protocol driver 934. The protocol driver 934 performs all of the application/socket-level functions to send/receive data to/from TCP/IP clients.

Figure 10:
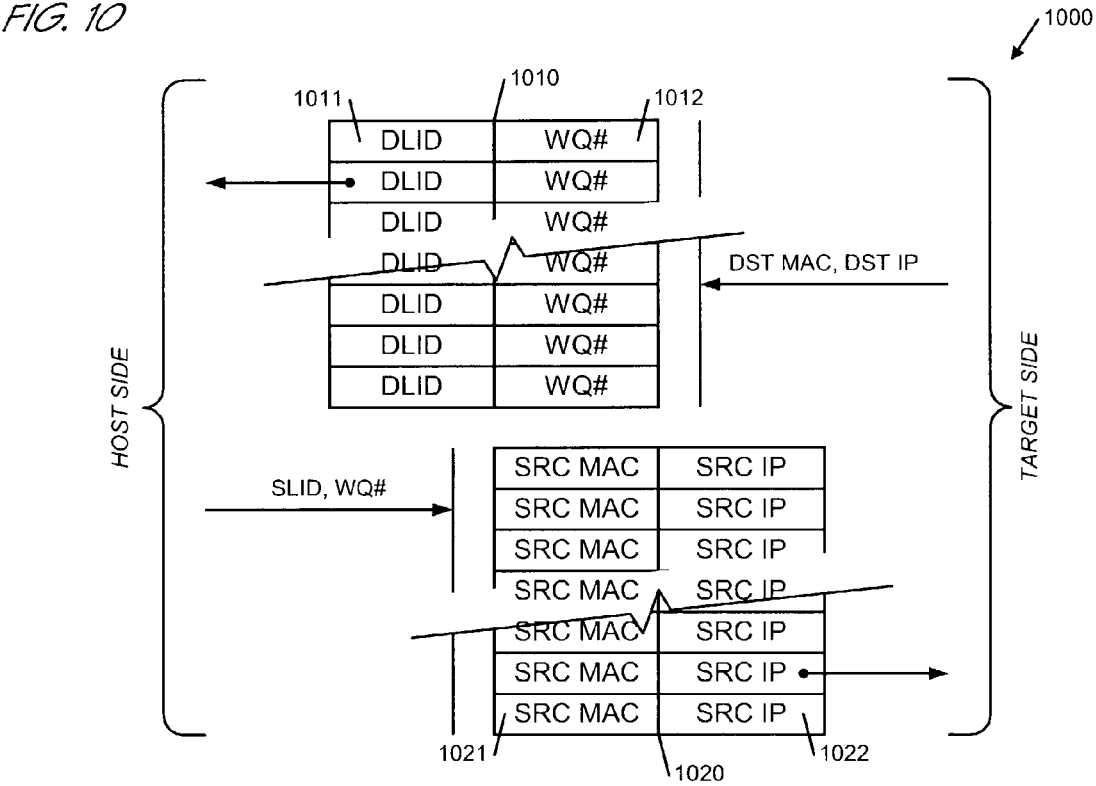
FIG. 10 is a block diagram showing how native TCP/IP connections are mapped within a connection correlator according to the present invention.

Referring to FIG. 10, a block diagram 1000 is presented showing how native TCP/IP connections are mapped within a connection correlator according to the present invention. A map of similar construction is also built within the correlation logic 554 inside a server described with reference to FIG. 5. The block diagram 1000 shows a TCP-to-IBA native map 1010 and an IBA-to-TCP native map 1020. The TCP-to-IBA native map 1010 associates destination addresses (i.e., destination MAC address, destination IP address) that are picked from native frame headers and their payloads received from a client network with a particular destination local identifier (DLID) 1011 and corresponding work queue number 1012 for unaccelerated TCP/IP communications with a particular server. In a load sharing embodiment, the TCP-to-IBA native map 1010 may be dynamically managed by a TCP-aware target adapter such that a single incoming destination IP address is mapped to several different DLIDs/WQs 1011/1012, thus causing client requests to be balanced over a number of servers. For an IP security embodiment, the TCP-to-IBA native map 1010 may map an incoming destination IP address to a DLID/WQ# 1011/1012 corresponding to an IP security server, thus causing client requests to first be processed for IP security reasons. In a firewall embodiment, the TCP-to-IBA native map 1010 associates an incoming destination IP address to a DLID/WQ# 1011/1012 corresponding to a firewall server, thus causing client requests to first be routed to the firewall. The IBA-to-TCP native map 1020 associates source local identifiers and work queue numbers that are picked from incoming IBA packet headers received from a server to a particular source MAC address 1012 and source IP address 1022 which are employed by a TCP-aware target adapter to generate IP headers and MAC headers for native frames sent to a client. The native maps 1010, 1020 within a connection correlator according to the present invention allow a TCP-aware target adapter to enable native TCP/IP connections between servers connected to an IBA fabric and clients connected to a native network.

Figure 11:
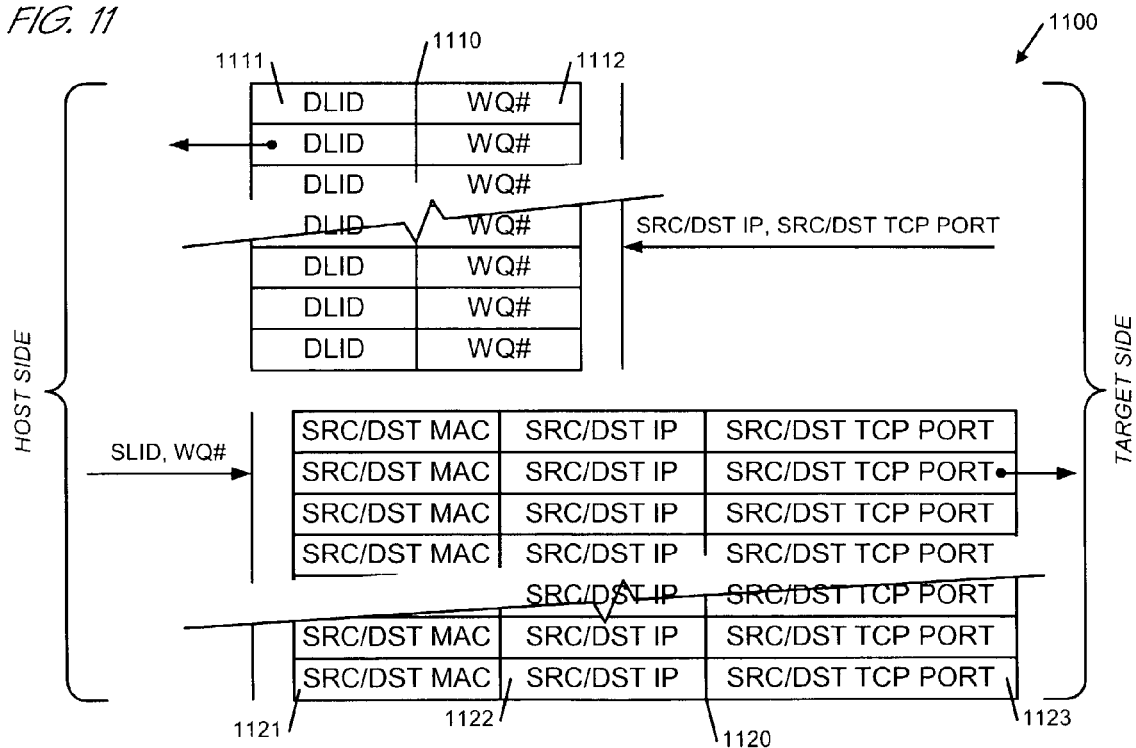
FIG. 11 is a block diagram showing how accelerated TCP/IP connections are mapped within a connection correlator according to the present invention.

Referring to FIG. 11, a block diagram 1100 is presented showing how accelerated TCP/IP connections are mapped within a connection correlator according to the present invention. A map of similar construction is also built within the correlation logic 554 inside a server described with reference to FIG. 5. The block diagram 1100 shows a TCP-to-IBA accelerated map 1110 and an IBA-to-TCP accelerated map 1120. The TCP-to-IBA accelerated map 1110 associates destination addresses (i.e., destination IP address, destination TCP port number) that are picked from native frame payloads received from a client network with a particular destination local identifier (DLID) 1111 and corresponding work queue number 1012 for accelerated TCP/IP communications with a particular server. The IBA-to-TCP native map 1120 associates source local identifiers and accelerated work queue numbers that are picked from incoming IBA packet headers received from a server (or multiple servers) to a particular set of source/destination MAC addresses 1121, source/destination IP addresses 1122, and source/destination TCP port numbers 1123. These connection parameters 1121–1123 are employed by a TCP-aware target adapter to generate TCP headers, IP headers, and MAC headers for native frames sent to a client to transmit data that is received over accelerated connections. The accelerated maps 1110, 1120 within a connection correlator according to the present invention allow a TCP-aware target adapter to enable accelerated TCP/IP connections between one or more servers connected to an IBA fabric and one or more clients connected to a native network.

The mapping configurations described with reference to FIGS. 10 and 11 provide for accelerated TCP/IP connections for any combination of servers and clients to include single server single client, single server-multiple clients, multiple servers-single client, and multiple servers-multiple clients. In addition, the mapping configurations and acceleration protocols support the interface of various combinations of servers and TCP-aware target adapters to include single server-single target adapter, single server-multiple target adapters, multiple servers-single target adapters, and multiple servers-multiple target adapters.

Figure 12:
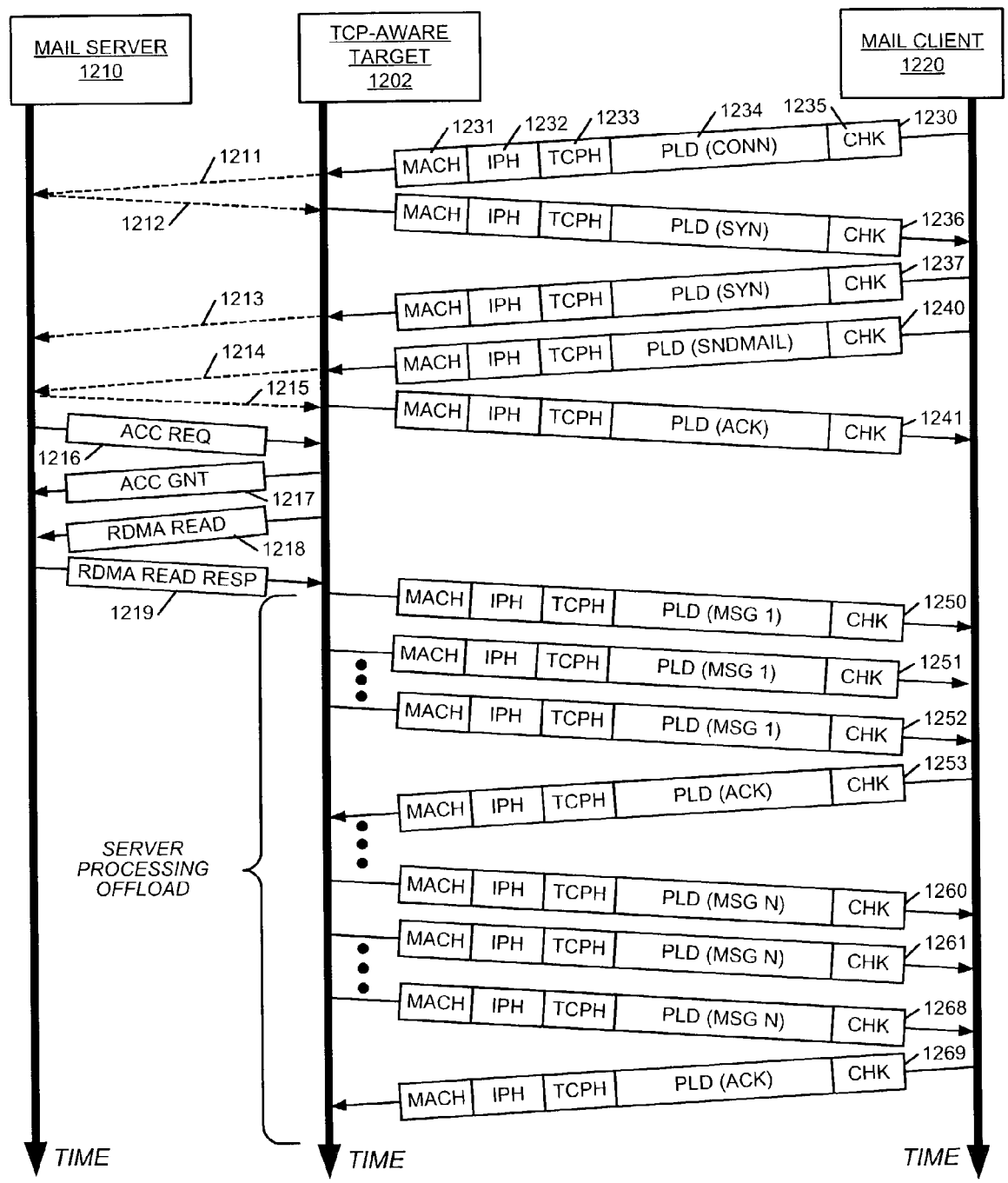
FIG. 12 is a timing diagram illustrating the sequence of Infiniband packets processed by a server and TCP/IP network transactions processed by a TCP-aware target adapter according to the present invention during an accelerated exemplary client-server mail transaction.

Now referring to FIG. 12, a timing diagram 1200 is presented illustrating the sequence of Infiniband packets processed by a server and TCP/IP network transactions processed by a TCP-aware target adapter according to the present invention during an accelerated exemplary client-server mail transaction. The timing diagram 1200 shows a mail server 1210 that is connected via an IBA fabric to a TCP-aware target adapter 1202 according to the present invention. The target adapter 1202 is connected via a native TCP/IP network to a mail client 1220. The timing diagram 1200 depicts representative IBA packets 1211–1219 that are passed over the IBA fabric and native frames 1230, 1236, 1237, 1240, 1241, 1250–1253, 1260, 1261, 1268, 1269 that are passed over the TCP/IP communications network 1) to establish a native TCP/IP connection between the client 1220 and the server 1210; 2) to establish an accelerated connection between the client 1220 and the server 1210 via the target adapter 1202; and 3) to transfer electronic mail data from the server 1210 to the client 1220. Although the generation of specific frames and sequences of commands for a specific client server configuration is a function of native network protocol, operating system specification, and application program constraints; one skilled in the art will appreciate that the timed sequence of frames 1230, 1236, 1237, 1240, 1241, 1250–1253, 1260, 1261, 1268, 1269 presented in the diagram 1200 are representative of that seen within a present day client-server electronic mail transfer.

As alluded to above, and as illustrated in native frame 1230, each of the frames 1230, 1236, 1237, 1240, 1241, 1250–1253, 1260, 1261, 1268, 1269 comprises a TCP payload field 1234, a TCP header 1233, an IP header 1232, and a MAC header 1231. In addition, since many native protocols also provide for error detection on a frame by-frame basis, a checksum field 1235 is also depicted that contains frame error detection data so that a receiving client NIC or native port within the target adapter 1202 can detect errors that occur during transmission.

To initiate a native TCP/IP connection, the client 1220 transmits frame 1230 to the server 1210. Within frame 1230, the payload 1234 contains a request to connect to the mail server application. The TCP header 1233 contains the server TCP port number for the connection (typically a well-known TCP port number for mail transactions) and other parameters to describe the type of connection that is desired. The IP header 1232 contains the IP address of the mail server 1210 as a destination and contains the IP address of the client 1220 as a source, thus providing the server with a return IP address for IP packets The MAC header 1231 contains source and destination MAC addresses that are modified along the path of transmission as the frame traverses the Internet from TCP/IP network to TCP/IP network. When the frame 1230 finally reaches the target adapter's local network, the MAC header will be modified to contain the destination MAC address of the target adapter 1202.

In that frame 1230 is a request to establish a connection with the server 1210, the TCP-aware target adapter 1202 embeds the frame 1230 within an IBA packet 1211 and forwards the packet 1211 to the server 1210. A connection correlation map (not shown) within the target adapter provides the DLID and work queue number for native connections with the server 1210. A connection acceleration driver (not shown) within the server 1210 receives the IBA packet 1211 and through its native transaction work queue routes the native frame 1230 up through the server's TCP/IP stack (not shown). Once the server 1210 has performed the functions corresponding to frame/packet/datagram reception within each of its MAC/IP/TCP processing layers, the connection request in payload 1234 is copied to the message reception buffer of the mail server application program. The application program, in granting the connection request, establishes a socket for communications with the client as described above. Through this socket, the mail program sends a synchronization acknowledgement to the client granting the connection. The connection acceleration driver within the server 1210 allows this native transaction to fall through the server's TCP/IP stack and embeds the synchronization acknowledgement within IBA packet 1212, resulting in transmission of frame 1236 to the client 1220. The synchronization acknowledgement is embedded within the payload field of frame 1236. When frame 1236 is received by the client 1220, the client 1230 establishes a corresponding socket for the mail transaction with the server 1210 and generates a synchronization acknowledgement that is transmitted to the server 1210 within the payload field of frame 1237. The target adapter 1202 forwards this native frame 1237 to the server 1210 within IBA packet 1213, thus completing a three way handshake. At this point, a TCP/IP connection has been established between the client 1220 and the server 1210.

Following establishment of the connection, the client 1220 issues a send mail request embedded as the payload of frame 1240, which is forwarded to the server 1210 in IBA packet 1214. The send mail request is processed up the TCP/IP stack of the server 1210 and provided to the mail program. The mail program receives the request and designates corresponding memory buffers that contain mail data to be transmitted to the client 1220. IBA packet 1215 acknowledges receipt of the send mail request. The corresponding acknowledgement frame 1241 is sent to the client 1220 by the target adapter 1202.

To send the electronic mail data that is contained within the designated memory buffers to the client 1220, the application program issues a send command to the TCP layer. The send command contains a pointer to the designated memory locations. At this point, the application program waits for a notification from the TCP layer that the data has been received by the client The connection acceleration driver intercepts this send command at the transport driver interface to the TCP/IP stack and issues an accelerated connection request to the TCP-aware target adapter 1202 in IBA packet 1216. The accelerated connection request 1216 contains TCP/IP connection parameters and memory locations of the message data, thus allowing the target adapter 1202 to map an accelerated work queue for transfer of the data. The target adapter 1202 sends IBA packet 1217 to the server 1210 granting the accelerated connection and designating the accelerated work queue number.

To transfer the data, the target adapter 1202 sends an RDMA read command in IBA packet 1218 to the server, directing a remote DMA of server memory at the memory locations containing the message data. DMA logic within the server's host channel adapter performs the DMA and the mail data is transferred to the target adapter via packet 1219, totally bypassing the server's TCP/IP stack. And as FIG. 12 illustrates, all of the ensuing frames 350, 351, 358, 359, 360, 361, 368, 369 that are required to deliver the data to the client 1220 are generated and/or processed by the TCP-aware target adapter 1202, completely offloading a significant amount of TCP/IP-related processing which would otherwise be required of the server 1210. Depending on the amount of data that is provided in packet 1219, this offload could result in processing savings corresponding to the generation of perhaps tens of TCP datagrams, hundreds of IP packets, and thousands of native frames 1250–1253, 1260, 1261, 1268, 1269.

As in the discussion with reference to FIG. 3, the present discussion presents the frame structure, TCP requests, and application program commands in the timing diagram 1200 in simplified terms to illustrate the essential transactions of a server-client mail transfer according to the present invention without encumbering the reader with details associated with a specific mail server application program, operating system, or network interface. One skilled in the art will acknowledge that the transactions presented in FIG. 12 are representative of those essential transactions required for the transfer of electronic mail messages in virtually any present day TCP/IP-enabled mail server. Furthermore, one skilled in the art will appreciate that although the example of FIG. 3 relates to the delivery of electronic mail messages to a client, frames 1250–1253, 1260, 1261, 1268, 1268 are indeed representative of any type of data transfer between a server and a client.

Figure 13:
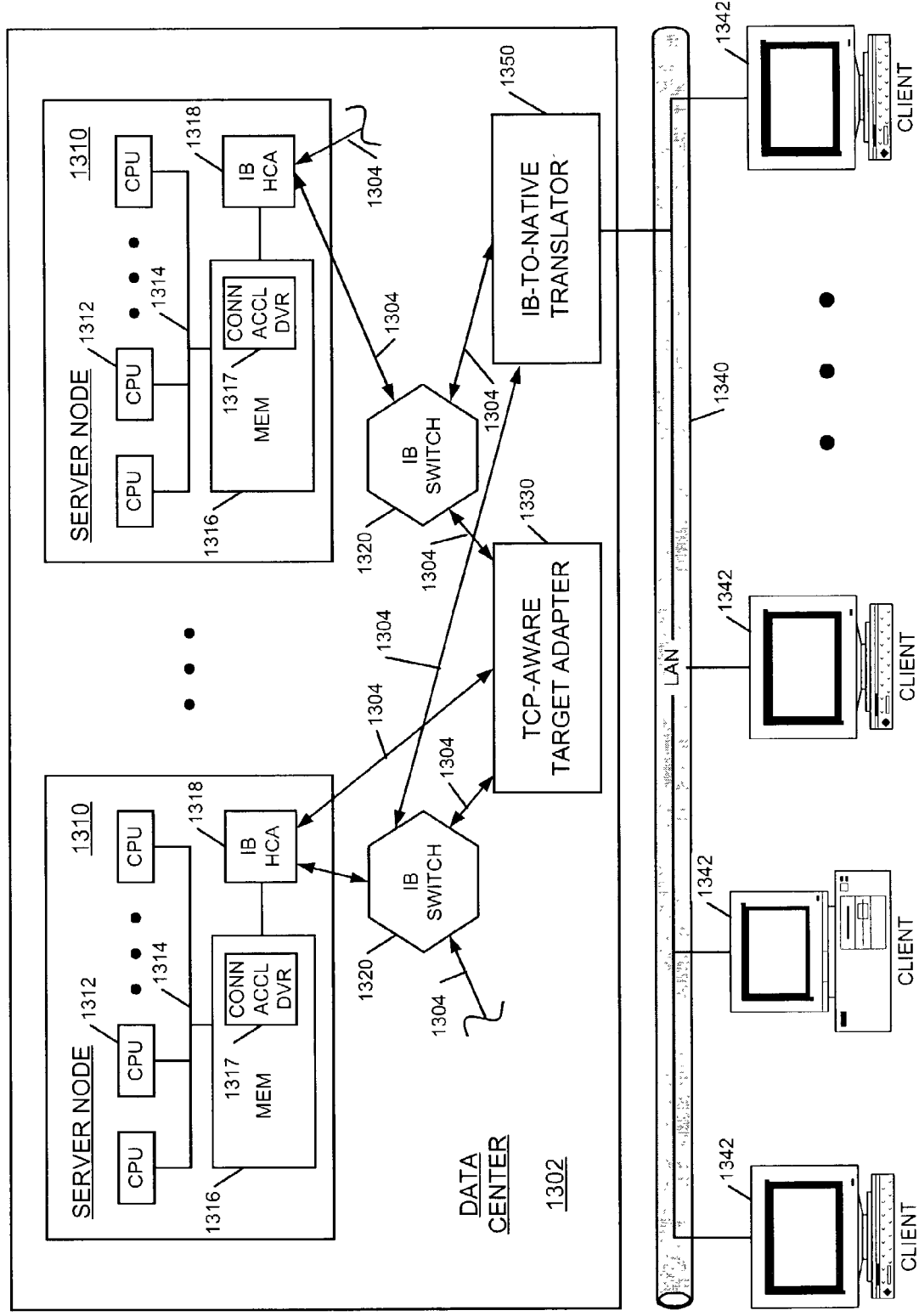
FIG. 13 is a block diagram featuring a system according to the present invention for accelerating client-server TCP/IP connections over an Infiniband Architecture network subsystem, where a TCP-aware target adapter is employed to provide TCP/IP transactions that are encapsulated within Infiniband packets over an IBA fabric to a simple Infiniband-to-native protocol translator.

Now referring to FIG. 13, a block diagram is presented featuring a system 1300 according to the present invention for accelerating client-server TCP/IP connections over an Infiniband Architecture network subsystem, where a TCP-aware target adapter 1330 is employed to provide TCP/IP transactions that are encapsulated within Infiniband packets over an IBA fabric to an Infiniband-to-native protocol translator 1350. The system 1300 includes one or more servers 1310 that are located within a data center 1302. The servers 1310 are interconnected over a data center point-to-point IBA fabric via Infiniband host channel adapters (HCAs) 1318. The Infiniband HCAs 1318 interface directly to a server's memory 1316 as opposed to interfacing to a CPU via a host bus 1314. The IBA fabric comprises a number of point-to-point links 1304 and cascaded switches 1320 that interconnect end nodes 1310, 1330, 1350 including host nodes 1310, a TCP-aware target adapter 1330, and a simple Infiniband-to-native protocol translator 1350. The block diagram also depicts a number of clients 1342 that are interconnected over a TCP/IP-based client LAN 1340. Accordingly, the client LAN 1340 may employ one of the native network protocols discussed above. In this type of accelerated connection configuration, the IBA-to-native translator 1350 interfaces the Infiniband fabric to the client LAN 1340.

In operation, the elements of the system 1300 illustrated in FIG. 13 function like elements of the system 400 discussed with reference to FIG. 4 that have the same tens and ones digits. The difference between the system 1300 of FIG. 13 and the system 400 of FIG. 4 is that the system 1300 of FIG. 13 is provided to accelerate client-server TCP/IP connections within a data center 1302 that utilizes Infiniband raw packet protocol for TCP/IP communications. Under an IBA raw packet protocol scheme, TCP/IP transaction packets are encapsulated within Infiniband packets by a sending device having TCP/IP processing capabilities. The IB-to-native translator 1350 strips IBA headers from outgoing encapsulated TCP/IP packets and routes the TCP/IP packets over the LAN 1340 to a client device 1342. The translator 1350 also encapsulates incoming TCP/IP packets from the LAN 1340 into Infiniband raw packets for transmission to a destination server 1310. The translator 1350 does not perform any TCP/IP stack functions such as timing, flow control, etc. These functions are presumed to be performed by the servers 1310 as well. The IBA-to-native translator 1350 maintains a connection map that associates either destination MAC addresses or destination IP addresses of TCP/IP packets received from the client LAN 1340 with a corresponding DLID/WQ# pair for routing of IBA packets over the IBA fabric.

The TCP-aware target adapter 1330 of FIG. 13 is employed to offload TCP/IP stack functions from the servers 1310 as described with reference to FIG. 4. In addition, the target adapter 1330 also performs the functions of Infiniband packet encapsulation and stripping. Thus, in one embodiment, incoming and outgoing unaccelerated TCP/IP packets between the servers 1310 and the IB-to-native translator 1350 are routed through the target adaptor 1330. In an alternative embodiment, incoming and outgoing unaccelerated TCP/IP packets are routed directly between the servers 1310 and the translator 1350. However, when accelerated connections are established as discussed above, the target adapter 1330, in addition to performing all the TCP/IP stack functions, performs Infiniband packet encapsulation and stripping functions as well. Accelerated connections to access data in server memory are performed by the target adapter 1330 via IBA remote DMA commands as is described above. The architecture of a TCP-aware target adapter 1330 for additionally performing Infiniband packet encapsulation/stripping functions is more specifically described with reference to FIG. 14.

Figure 14:
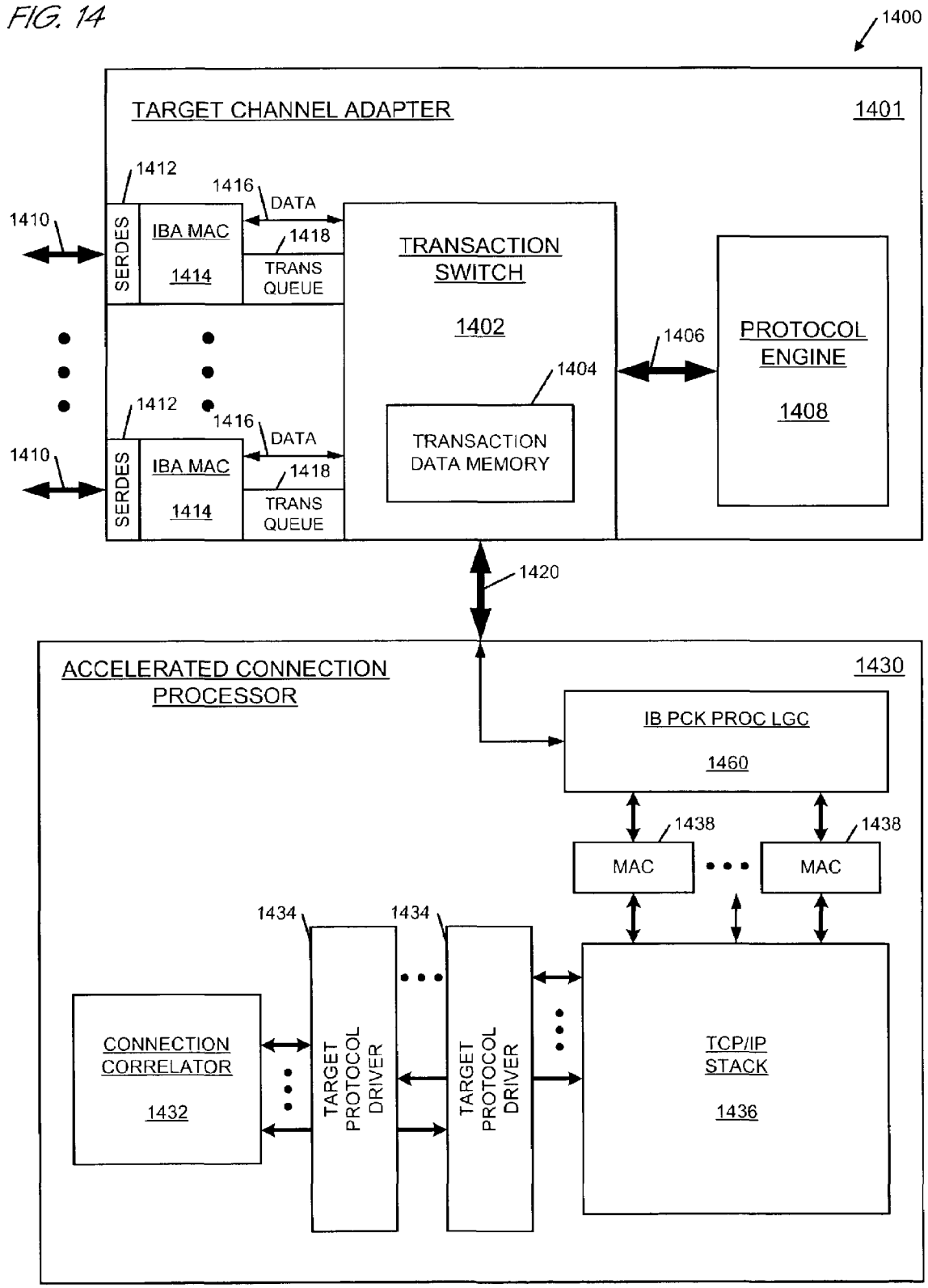
FIG. 14 is a block diagram illustrating an alternative embodiment of a TCP-aware target adapter according to the present invention.

Referring to FIG. 14, a block diagram is presented illustrating an alternative embodiment of a TCP-aware target adapter 1400 according to the present invention that is employed within the system configuration 1300 of FIG. 13. The target adapter 1400 includes an IBA target channel adapter 1401 that is coupled to an accelerated connection processor 1430 via bus 1420. In one embodiment, both the target channel adapter 1401 and the accelerated connection processor 1430 exist as logic elements 1401, 1430 within the same integrated circuit. In an alternative embodiment, the target channel adapter 1401 and the accelerated connection processor 1430 are separate integrated circuits within the same circuit card assembly. In a PCI-based embodiment, bus 1420 is a PCI or PCI-X bus 1420. In a further alternative embodiment, the target channel adapter 1401 and the accelerated connection processor 1430 reside on different circuit card assemblies that are interconnected over a PCI/PCI-X bus 1420.

The IBA target channel adapter 1401 has a transaction switch 1402 that is coupled to a plurality of IBA MAC controllers 1414 via a corresponding plurality of transaction queues 1418 Data is transferred between the MACs 1414 and the switch 1402 via a plurality of data buses 1416. Each MAC 1414 couples to IBA serializer-deserializer logic 1412, which provides physical interface of IBA symbols to a corresponding IBA link 1410. IBA transactions are provided to the transaction switch 1402 through each transaction queue 1418 Payload data for IBA transactions is routed via data buses 1416 to transaction data memory 1404 within the switch 1402. The transaction switch 1402 is also coupled to a protocol engine 1408 via bus 1406.

The accelerated connection processor 1430 includes a TCP/IP stack 1436 that is coupled to Infiniband packet processing logic 1460 via a plurality of native MAC logic elements 1438 The Infiniband packet processing logic 1460 encapsulates native protocol packets within Infiniband raw packets for transmission to an Infiniband-to-native translation device, like that described with reference to FIG. 13. The Infiniband packet processing logic 1460 also strips off Infiniband headers from Infiniband raw packets received from the translation device. The TCP/IP stack 1436 is also coupled to a plurality of target protocol drivers 1434. The protocol drivers are coupled to a connection correlator 1432. In one embodiment, the plurality of target protocol drivers 1434 and MAC logic elements 1438 provide for TCP/IP native network frame transmission and reception in accordance with a single native network protocol. In an alternative embodiment, frame processing according to two or more native protocols is provided for by the drivers 1434 and MAC elements 1438.

In operation, elements of the TCP-aware target adapter 1400 function very much like those elements described with reference to the TCP aware target adapter 900 of FIG. 9 that have the same tens and ones digits. The difference between the two target adapters 900, 1400, however, is that the target adapter 1400 of FIG. 14 does not have any native protocol ports. Instead, native transactions produced by the TCP/IP stack 1436 and MAC logic elements 1438 are passed to the packet processing logic 1460, which encapsulates the native transactions within Infiniband packets. The Infiniband packets are provided to the channel adapter 1401 via bus 1420 for transmission over the IBA fabric 1410 to the Infiniband-to-native protocol translator. Even though the native transmissions are encapsulated into Infiniband packets, TCP/IP and MAC processing functions such as timing, windowing, and etc., are still performed by the TCP-aware target adapter 1400. Accelerated connections operate in the same manner as was discussed above with reference to FIG. 9, the only difference being that Infiniband headers are added to and stripped from the transactions by the processing logic 1460.

Figure 15:
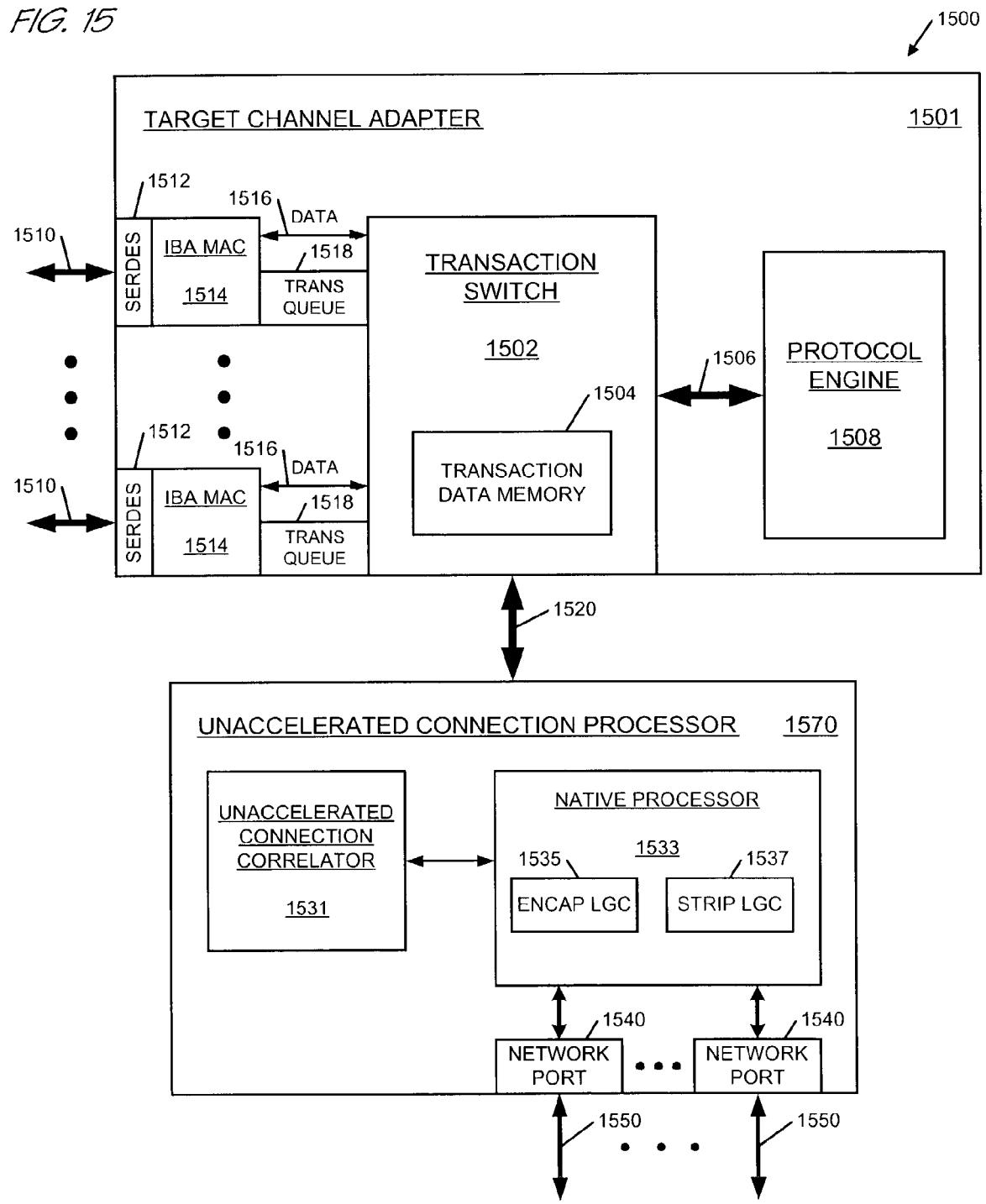
FIG. 15 is a block diagram is illustrating an IB-to-native translator 1500 according to according to the present invention.

Referring to FIG. 15, a block diagram is presented illustrating an IB-to-native translator 1500 according to according to the present invention such as has been alluded to with reference to FIGS. 13–14. The native translator 1500 includes an IBA target channel adapter 1501 that is coupled to an unaccelerated connection processor 1570 via bus 1520. In one embodiment, both the target channel adapter 1501 and the unaccelerated connection processor 1570 exist as logic elements 1501, 1570 within the same integrated circuit. In an alternative embodiment, the target channel adapter 1501 and the unaccelerated connection processor 1570 are separate integrated circuits within the same circuit card assembly. In a PCI-based embodiment, bus 1520 is a PCI or PCI X bus 1520. In a further alternative embodiment, the target channel adapter 1501 and the unaccelerated connection processor 1570 reside on different circuit card assemblies that are interconnected over a PCI/PCI-X bus 1520.

The IBA target channel adapter 1501 has a transaction switch 1502 that is coupled to a plurality of IBA MAC controllers 1514 via a corresponding plurality of transaction queues 1518. Data is transferred between the MACs 1514 and the switch 1502 via a plurality of data buses 1516. Each MAC 1514 couples to IBA serializer-deserializer logic 1512, which provides physical interface of IBA symbols to a corresponding IBA link 1510. IBA transactions are provided to the transaction switch 1502 through each transaction queue 1518. Payload data for IBA transactions is routed via data buses 1516 to transaction data memory 1504 within the switch 1502. The transaction switch 1502 is also coupled to a protocol engine 1508 via bus 1506.

The unaccelerated connection processor 1570 has a native processor 1533. The native processor 1533 includes encapsulation logic 1535 and strip logic 1537. The encapsulation logic 1535 encapsulates native protocol packets within Infiniband raw packets for transmission over an IBA fabric to a server or to a TCP-aware target adapter, like those described with reference to FIG. 13. The strip logic 1460 strips off Infiniband headers from Infiniband raw packets received from the IBA fabric for transmission of TCP/IP packets to a client over a native LAN 1550. The native processor 1533 is coupled to an unaccelerated connection correlator 1531 and to a plurality of native network ports 1540. Each of the native network ports 1540 is connected to a native client LAN 1550. In one embodiment, the plurality of native network ports 1540 provide for TCP/IP native network frame transmission and reception in accordance with a single native network protocol. In an alternative embodiment, frame processing according to two or more native protocols is provided for by the native ports 1540.

In operation, elements of the IB-to-native translator 1500 function very much like those elements described with reference to the TCP-aware target adapter 900 of FIG. 9 that have the same tens and ones digits. The difference between the target adapters 900 and the translator 1500 is that the translator does not have any TCP/IP-related processing logic such as a TCP/IP stack, target protocol drivers, or MAC logic elements. Instead, all TCP/IP processing functions are performed by servers or a TCP-aware target adapter connected to the IBA fabric 1510, and by client devices connected to the LAN 1550. All IBA packets received by the translator 1500 over the IBA fabric 1510 have encapsulated TCP/IP packets within. To route these TCP/IP packets to a client device, strip logic 1537 within the native processor 1533 strips out the IBA encapsulation data and formats MAC and/or IP header data according to mappings provided by the unaccelerated connection correlator 1531. The TCP/IP packets are then transmitted to the client device over one of the native network ports 1540. All TCP/IP packets received by the translator 1500 over the native LANS 1550 must be encapsulated within IBA raw packets for transmission over the IBA fabric 1510. To route these IBA raw packets to a server or to a TCP-aware target adapter, encapsulation logic 1535 within the native processor 1533 encapsulates the TCP/IP packets into IBA raw packets and assigns destination local identifier (DLID) fields and work queue numbers within the IBA raw packets according to mappings provided by the unaccelerated connection correlator 1531. The IBA raw packets are then transmitted to a designated server or to a TCP-aware target adapter over the IBA fabric 1510.

Figure 16:
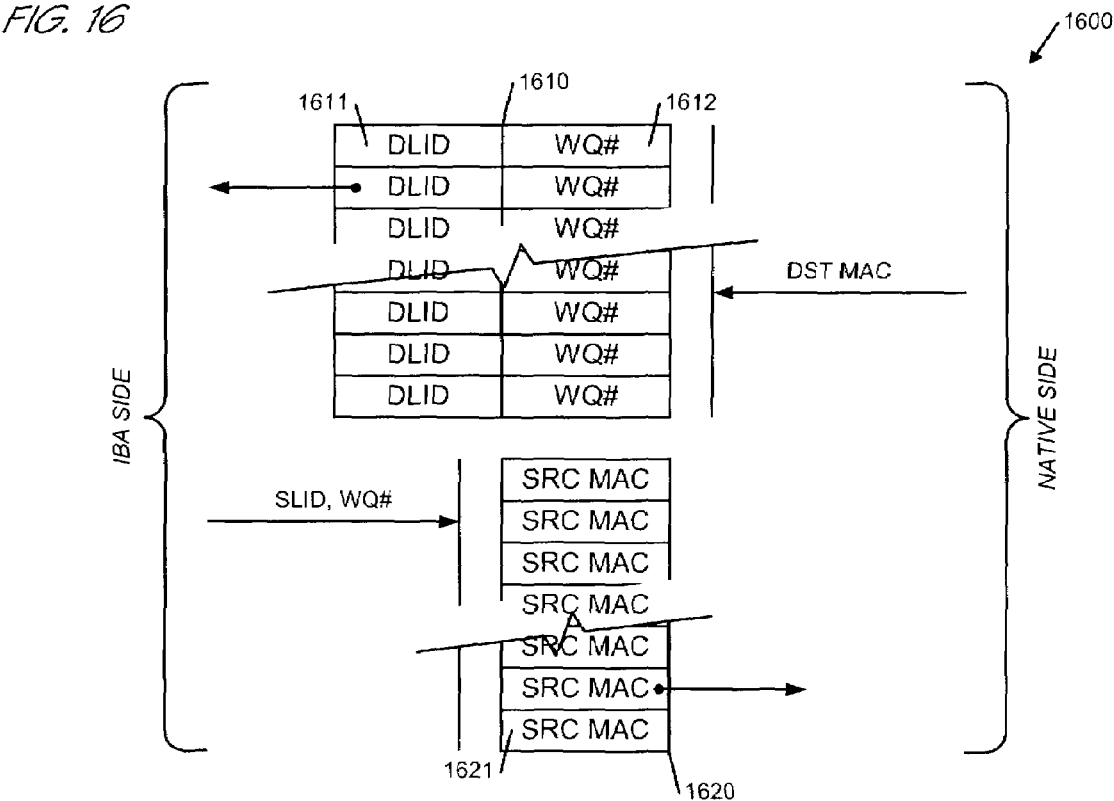
FIG. 16 is a block diagram showing how native MAC connections are mapped within a an unaccelerated connection correlator employed by the native translator of FIG. 15.

Now referring to FIG. 16, a block diagram 1600 is presented showing how native MAC connections are mapped within a an unaccelerated connection correlator employed by the native translator of FIG. 15. The block diagram 1600 shows a native MAC-to-IBA map 1610 and an IBA-to-native MAC map 1620. The native MAC-to-IBA map 1610 associates destination MAC addresses that are picked from native frame headers and their payloads received from a client network with a particular destination local identifier (DLID) 1611 and corresponding work queue number 1612 for unaccelerated TCP/IP communications between the client and either a particular server or a TCP-aware target adapter connected to the IBA fabric. In a generalized MAC sharing embodiment, the native MAC-to-IBA map 1610 may be dynamically managed such that a single incoming destination MAC address is mapped to several different DLIDs/WQs 1611/1612. The IBA-to-native MAC map 1620 associates source local identifiers and work queue numbers that are picked from incoming IBA raw packet headers received from a server/TCP-aware target adapter to a particular source MAC address 1621 which is employed within a MAC headers for native frames sent to a client. The native maps 1610, 1620 within an unaccelerated connection correlator according to the present invention allow a an IB-to-native translator to route transactions between clients connected to a TCP/IP client LAN and servers/TCP aware target adapters connected to an IBA fabric.

Figure 17:
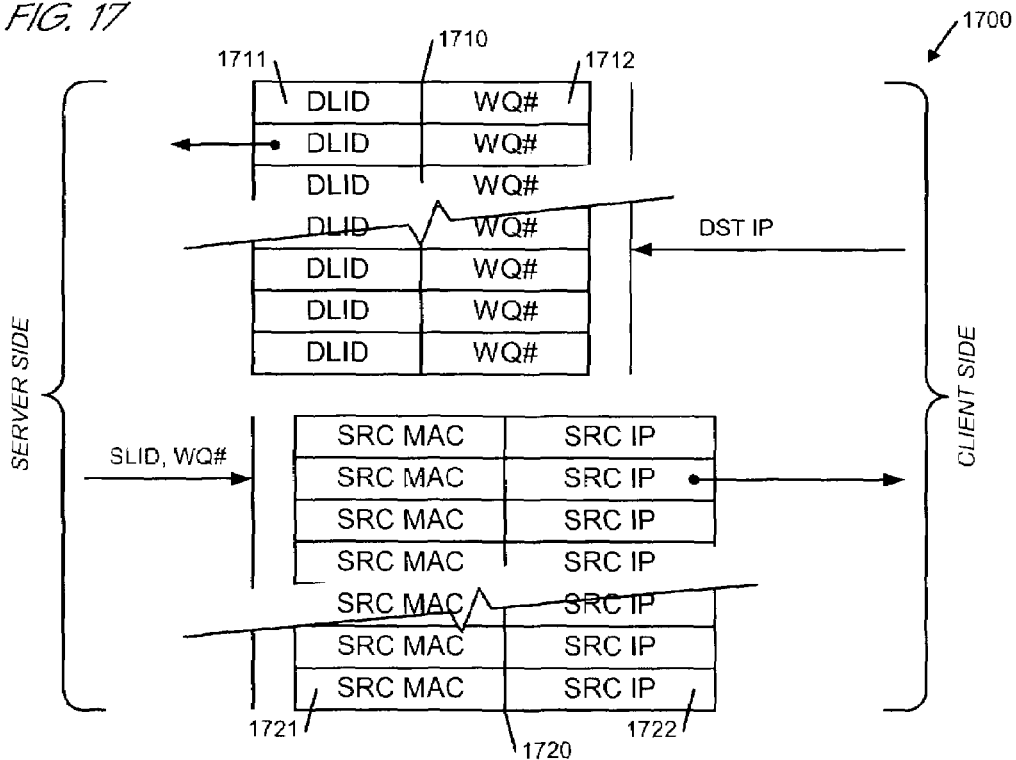
FIG. 17 is a block diagram showing how native IP connections are mapped within a an unaccelerated connection correlator employed by the native translator of FIG. 15.

Now referring to FIG. 17, a block diagram 1700 is presented showing how native IP connections are mapped within a an unaccelerated connection correlator employed by the native translator of FIG. 15. The block diagram 1700 shows a native IP-to-IBA map 1710 and an IBA-to-IP map 1720. The IP-to-IBA map 1710 associates destination IP addresses that are picked from native packet IP headers received from a client network with a particular destination local identifier (DLID) 1711 and corresponding work queue number 1712 for unaccelerated TCP/IP communications between the client and either a particular server or a TCP-aware target adapter connected to the IBA fabric. This mapping scheme within an unaccelerated connection correlator can be used in a load sharing embodiment of the system of FIG. 13, a firewall embodiment, an IP security embodiment, or any other embodiment where it is important to select a DLID/WQ# based upon destination IP address in a received TCP/IP translation. The IBA-to-IP map 1720 associates source local identifiers and work queue numbers that are picked from incoming IBA raw packet headers received from a server/TCP-aware target adapter to a particular source MAC address 1721 and source IP address 1722 which are employed within MAC headers and IP headers for native frames sent to a client.

Figure 18:
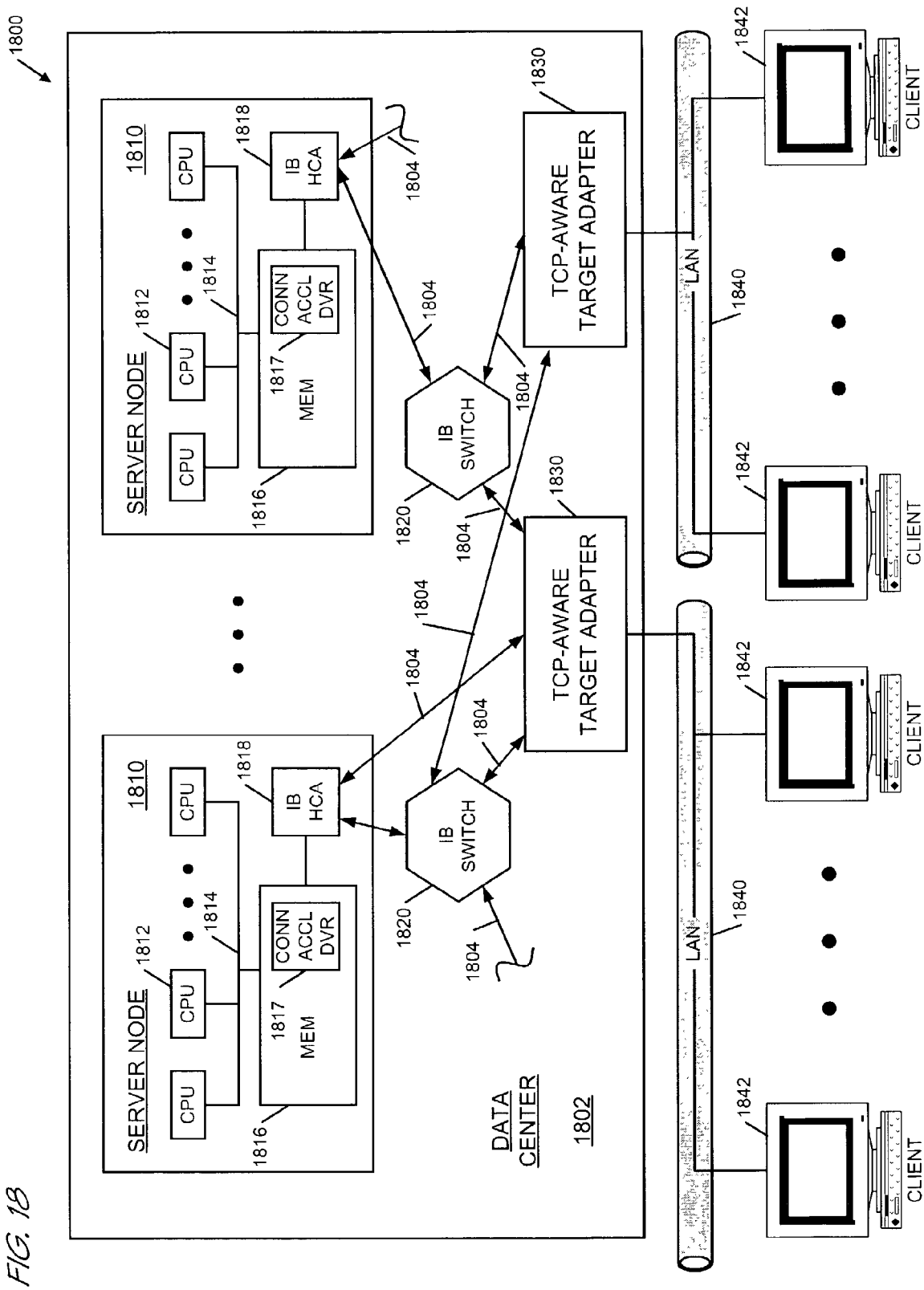
FIG. 18 is a block diagram featuring a system according to the present invention for accelerating client-server TCP/IP connections over an Infiniband Architecture network subsystem, where multiple TCP-aware target adapters are employed to provide TCP/IP transactions over multiple client local area networks.

Now referring to FIG. 18, a block diagram is presented featuring a system 1800 according to the present invention for accelerating client-server TCP/IP connections over an Infiniband Architecture network subsystem, where multiple TCP-aware target adapters are employed to provide TCP/IP transactions over multiple client local area networks 1840. The configuration shown in FIG. 18 is identical to the configuration depicted in FIG. 4, with the exception that two TCP-aware target adapters 1830 are shown interfacing to two client networks 1840. The mapping scheme discussed with reference to FIGS. 10 and 11 supports multiple server-target configurations. In one embodiment, the multiple target adapters 1830 provide redundant paths to the same client network 1840. In an alternative embodiment, the multiple target adapters 1830 provide for fail-over routing. In a load balancing embodiment, the multiple target adapters 1530 support a balanced provision of services from a multiple servers 1810 within the data center 1802. Although only two TCP-aware target adapters 1530 and client LANS 1540 are depicted in FIG. 15, one skilled in the art will appreciate that the accelerated connection mapping scheme according to the present invention will support a many server 1810-to-many target adapter 1830 configuration as well. In an alternative embodiment, one or more the TCP-aware target adapters 1830 within the system 1800 of FIG. 18 can be replaced by a combination of an IB-to-native translator and target adapter having only IBA ports as described with reference to FIGS. 13–17.

The present overcomes the notable amount of TCP/IP/MAC-related processing that servers must perform in order to accomplish transfer of service result data to a client by employing IBA apparatus and method to offload this processing to a target adapter. In accordance with the present invention, the number of servers within a data center can be scaled without impacting hardware or software corresponding to the client network. Furthermore, the technology of client networks can be upgraded without impacting servers within an existing data center.

Although the present invention and its objects, features, and advantages have been described in detail, other embodiments are contemplated by the present invention as well. For example, the present invention has been particularly characterized in the context of web page servers within a large data center. Although web page services today account for a large majority of the services provided over TCP/IP networks, other types of server applications are anticipated as well. Such services include remote TCP/IP-based storage services and file distribution. The present invention is exceptionally well suited to offload TCP/IP processing for streaming media servers, voice over IP (VoIP) communications, and sects of the industry where the movement of large amounts of data is time constrained.

In addition, the present invention has been described in terms of a connection acceleration driver that exists within server memory in a fashion that circumvents an existing TCP/IP stack within the server's operating system. And although this type of interface is anticipated in the near term, as server architectures migrate to the point where TCP/IP is no longer part of the operating system, the present invention contemplates a connection acceleration driver having an integral TCP/IP stack, very much like that provided within a TCP aware target adapter according to the present invention. Use of this type of embodiment allows a server that does not have TCP/IP capability (i.e., perhaps Infiniband only) to execute legacy TCP-based application programs that provide connectivity to TCP/IP-based client networks.

Furthermore, the present invention has been described as providing for both native and accelerated TCP/IP connections in a number of native protocols that are presently employed today such as Ethernet, FDDI, etc. But native protocols evolve, as seen in the case of emerging Gigabit Ethernet technologies. Application of the present invention comprehends this evolution of native protocol technologies by allowing the native protocol of a network to be upgraded in such a manner that the commensurate changes to servers in a data center are minimized to perhaps upload of driver software.

Moreover, the present invention contemplates offload of the processing require of a server to move application data. The present inventors view this type of embodiment as one that will predominately be employed. However, the architecture of the present invention also supports connection acceleration at the TCP level. In a TCP-accelerated embodiment, TCP segments are retrieved from the server as opposed to application data. Such an embodiment has sees application in certain types of servers that do not provide for direct access of some applications, perhaps for security reasons.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A TCP-aware target adapter, for accelerating TCP/IP connections between a plurality of clients and a plurality of servers, the plurality of servers being accessed via an Infiniband fabric, the plurality of clients being accessed via a TCP/IP network, the TCP-aware target adapter comprising:

an accelerated connection processor, configured to bridge TCP/IP transactions between the plurality of clients and the plurality of servers, wherein said accelerated connection processor accelerates the TCP/IP connections by bypassing a TCP/IP stack employed in one or more of the plurality of servers by issuing Infiniband remote direct memory access operations to retrieve/provide transaction data from/to the plurality of servers, wherein said accelerated connection processor comprises:

a connection correlator, configured to map TCP/IP connection parameters with a target work queue number for each of a plurality of accelerated TCP/IP connections, wherein said target work queue number corresponds to a work queue pair; and a target channel adapter, coupled to said accelerated connection processor, configured to support Infiniband operations with the plurality of servers, and configured to execute said Infiniband remote direct memory access operations to retrieve/provide said transaction data responsive to said Infiniband remote direct memory access operations issued to said work queue pair, wherein said accelerated connection processor handles TCP/IP processing of said transaction data;

whereby the TCP/IP connections are accelerated by offloading TCP/IP processing performed by the plurality of servers to retrieve/provide said transaction data.

2. The TCP-aware target adapter as recited in claim 1, wherein said accelerated connection processor comprises:

a plurality of native network ports, each of said native network ports communicating with the plurality of clients in a native network protocol corresponding to the plurality of clients.

3. The TCP-aware target adapter as recited in claim 2, wherein said native network protocol comprises one of the following protocols: Ethernet, Wireless Ethernet, Fiber Distributed Data Interconnect (FDDI), Attached Resource Computer Network (ARCNET), Synchronous Optical Network (SONET), Asynchronous Transfer Mode (ATM), and Token Ring.

4. The TCP-aware target adapter as recited in claim 2, wherein said accelerated connection processor supports TCP/IP transactions with the plurality of clients by receiving/transmitting native transactions in accordance with said native network protocol.

5. The TCP-aware target adapter as recited in claim 4, wherein said each of a plurality of accelerated TCP/IP connections comprises:

a plurality of said Infiniband remote direct memory access operations between a particular server and said target channel adapter to retrieve/provide particular transaction data from/to said particular server; and corresponding native transactions between said accelerated connection processor and a particular client to provide/retrieve said particular transaction data to/from said particular client.

6. The TCP-aware target adapter as recited in claim 1, wherein said TCP/IP connection parameters comprise: source TCP port number, destination TCP port number, source IP address, and destination IP address.

7. The TCP-aware target adapter as recited in claim 1, wherein said target work queue number corresponds to a host work queue number within a specific server, said specific server being designated by said accelerated connection processor to support said each of a plurality of accelerated TCP/IP connections with a specific client.

8. An apparatus in a server connected to an Infiniband fabric for implementing accelerated TCP/IP connections between the server and clients, the clients being connected to a TCP/IP network, the apparatus comprising:

a connection acceleration driver, configured to manage the accelerated TCP/IP connections, wherein said connection acceleration driver designates memory locations within server memory such that transaction data can be retrieved/provided via Infiniband remote direct memory access operations, wherein said connection acceleration driver comprises:

correlation logic, configured to map TCP/IP connection parameters with a host work queue number for each of the accelerated TCP/IP connections, wherein said host work queue number corresponds to a work queue pair; and a host channel adapter, coupled to said connection acceleration driver, configured to execute Infiniband operations via the Infiniband fabric, and configured to execute direct memory access functions to retrieve/provide said transaction data responsive to said Infiniband remote direct memory access operations issued to said work queue pair, wherein an accelerated connection processor handles TCP/IP processing of said transaction data;

whereby the accelerated TCP/IP connections offload TCP/IP processing performed by the server by bypassing a TCP/IP stack employed in the server to retrieve/provide said transaction data.

9. The apparatus as recited in claim 8, wherein a particular accelerated TCP/IP connection comprises:

a plurality of said remote direct memory access operations between the server and a TCP-aware target adapter to retrieve/provide particular transaction data from/to a particular memory location; and corresponding native transactions between said TCP-aware target adapter and a particular client to provide/retrieve said particular transaction data to/from said particular client.

10. The apparatus as recited in claim 8, wherein said connection acceleration driver further comprises:

native queue logic, configured to interpret a native network protocol corresponding to the clients, and configured to request/receive first Infiniband operations having native TCP/IP transactions to/from the clients that are embedded within Infiniband packets;

accelerated queue logic, configured to request second Infiniband operations to establish the accelerated TCP/IP connections, said second Infiniband operations designating said memory locations; and a transport driver interface mux, coupled to said accelerated queue logic, configured to receive said memory locations from application programs, and configured to provide said memory locations to said accelerated queue logic.

11. The apparatus as recited in claim 10, wherein said transport driver interface mux is coupled via a transport driver interface to a TCP/IP stack within the server.

12. The apparatus as recited in claim 10, wherein said TCP/IP connection parameters comprise: source TCP port number, destination TCP port number, source IP address, and destination IP address.

13. The apparatus as recited in claim 10, wherein said host work queue number corresponds to a target work queue number within a TCP-aware target adapter, said TCP-aware target adapter providing corresponding native transactions to the clients for said each of the accelerated TCP/IP connections.

14. An apparatus within a client-server environment for managing an accelerated TCP/IP connection between a server connected to an Infiniband fabric and a client connected to a TCP/IP network, the apparatus comprising;

a host driver, for providing a host work queue pair through which transaction data corresponding to the accelerated TCP/IP connection is transmitted/received via the Infiniband fabric; and a TCP-aware target adapter, coupled to said host driver, for providing a target work queue pair corresponding to said host work queue pair, and for executing a remote direct memory access operation to receive/transmit said transaction data via the Infiniband fabric, wherein said TCP-aware target adapter receives/transmits said transaction data responsive to said remote direct memory access operation issued to said target work queue pair, and wherein said TCP-aware target adapter handles TCP/IP processing of said transaction data, said TCP-aware target adapter comprises:

a connection correlator, for mapping TCP/IP connection parameters for the accelerated connection with a target work queue number corresponding to said target work queue pair;

whereby the accelerated TCP/IP connection offloads TCP/IP processing performed by the server by bypassing a TCP/IP stack employed in the server to receive/transmit said transaction data.

15. The apparatus as recited in claim 14, wherein said TCP-aware target adapter further comprises:
a plurality of native network ports, each of said native network ports communicating with TCP/IP clients via a corresponding native network protocol.

16. The apparatus as recited in claim 15, wherein said corresponding native network protocol comprises one of the following protocols: Ethernet, Wireless Ethernet, Fiber Distributed Data Interconnect (FDDI), Attached Resource Computer Network (ARCNET), Synchronous Optical Network (SONET), Asynchronous Transfer Mode (ATM), and Token Ring.

17. The apparatus as recited in claim 15, wherein said TCP-aware target adapter further comprises:
an accelerated connection processor, for supporting TCP/IP transactions with the client by receiving/transmitting native transactions in accordance with said corresponding native network protocol.

18. The apparatus as recited in claim 17, wherein said host driver comprises:
connection correlation logic, for associating said TCP/IP connection parameters for the accelerated connection with a host work queue number that correspond to said host work queue pair.

19. The apparatus as recited in claim 18, wherein said TCP/IP connection parameters comprise: source TCP port number, destination TCP port number, source IP address, and destination IP address.

20. A method for accelerating TCP/IP connections in a client-server environment having clients that are connected to a TCP/IP network and servers that are connected to an Infiniband fabric, the method comprising:
mapping TCP/IP connection parameters for accelerated connections to corresponding host and target work queue numbers that correspond to host and target work queue pairs;
offloading TCP/IP processing performed by the servers by bypassing a TCP/IP stack employed in one or more of the servers by executing Infiniband remote direct memory access operations to retrieve/transmit data associated with the accelerated connections from/to memory within the servers;
issuing the Infiniband remote direct memory access operations to said target work queue pairs; and
providing the data to/from a TCP-aware target adapter responsive to said issuing; wherein the TCP-aware target adapter handles TCP/IP processing of said data.

21. The method as recited in claim 20, wherein said mapping comprises:
intercepting the TCP/IP connection parameters from the requests to send/receive data from/to the servers; and
establishing Infiniband connections between the servers and a TCP-aware target adapter.

22. The method as recited in claim 21, wherein said executing comprises:
providing the TCP-aware target adapter with memory locations within the servers for transmission/reception of the data;
from the TCP-aware target adapter, transmitting the remote direct memory access operations to the servers; and
from the servers, providing remote direct memory access responses.

23. The method as recited in claim 20, further comprising:
generating TCP/IP transactions in a native network protocol to provide the data to the clients.

24. A method for offloading server TCP/IP processing in a client-server environment, comprising:
bypassing a TCP/IP stack employed in a server utilizing remote direct memory access operations via an Infiniband fabric to directly access data from/to server memory, wherein the data is provided to/from a TCP-aware target adapter, the TCP-aware target adapter providing native network ports that connect to clients, wherein said utilizing comprises:
mapping TCP/IP connection parameters for a particular TCP/IP connection with a work queue number that corresponds to a work queue pair within the TCP-aware target adapter;
issuing remote direct memory access requests to the work queue pair; and
providing the data to/from the TCP-aware target adapter responsive to said issuing, wherein the TCP-aware target adapter handles TCP/IP processing of said data; and
via the TCP-aware target adapter, generating native network transactions to transfer the data to/from clients.

25. The method as recited in claim 24, wherein said generating comprises:
formulating TCP headers, IP headers, and native network headers for messages to/from the clients based upon the TCP/IP connection parameters provided by said associating.

26. A TCP-aware target adapter, for accelerating TCP/IP connections between a plurality of clients and a plurality of server, the plurality of servers being accessed via an Infiniband fabric, the plurality of clients being accessed via a TCP/IP network, the TCP-aware target adapter comprising:
an accelerated connection processor, configured to bridge TCP/IP transactions between the plurality of clients and the plurality of servers, wherein said accelerated connection processor accelerates the TCP/IP connections by bypassing a TCP/IP stack employed in one or more of the plurality of servers by issuing remote direct memory access operations to retrieve/provide transaction data from/to the plurality of servers, and wherein said accelerated connection processor comprises:
a connection correlator, configured to map TCP/IP connection parameters which uniquely identify the TCP/IP connections with corresponding work queue numbers, wherein said work queue numbers correspond to work queue pairs; and
a target channel adapter, coupled to said accelerated connection processor, configured to support Infiniband operations with the plurality of servers, and configured to retrieve/provide said transaction data responsive to said remote direct memory access operations issued to said work queue pairs, wherein said accelerated connection processor handles TCP/IP processing of said transaction data, and configured to route said transaction data to/from the plurality of clients as embedded payloads within Infiniband packets;
whereby the TCP/IP connections are accelerated by offloading TCP/IP processing performed by the plurality of servers to retrieve/provide said transaction data.

27. The TCP-aware target adapter as recited in claim 26, wherein said accelerated connection processor supports TCP/IP transactions with the plurality of clients by formatting and processing native transactions in accordance with a native network protocol corresponding to the plurality of clients.

28. The TCP-aware target adapter as recited in claim 27, wherein said accelerated connection processor encapsulates outgoing TCP/IP transactions within Infiniband raw packets for transmission to the plurality of clients.

29. The TCP-aware target adapter as recited in claim 28, wherein said each of a plurality of accelerated TCP/IP connections comprises:
a plurality of said remote direct memory access operations between a particular server and said target channel adapter to retrieve/provide particular transaction data from/to said particular server; and
corresponding native transactions between said accelerated connection processor and a particular client to provide/retrieve said particular transaction data to/from said particular client, wherein said corresponding native transactions are encapsulated within Infiniband raw packets.

30. The TCP-aware target adapter as recited in claim 26, wherein said TCP/IP connection parameters comprise: source TCP port number, destination TCP port number, source IP address, and destination IP address.

31. The TCP-aware target adapter as recited in claim 30, wherein said target work queue number corresponds to a host work queue number within a specific server, said specific server being designated by said accelerated connection processor to support said each of a plurality of accelerated TCP/IP connections with a specific client.

32. The TCP-aware target adapter as recited in claim 29, wherein said connection correlator associates native connection parameters with a target work queue number for said each of a plurality of unaccelerated TCP/IP connections.

33. The TOP-aware target adapter as recited in claim 32, wherein said native connection parameters comprise: source MAC address and destination MAC address.

34. The TCP-aware target adapter as recited in claim 33, wherein said target work queue number corresponds to a host work queue number within a specific server, said specific server being designated by said accelerated connection processor to support said each of a plurality of unaccelerated TCP/IP connections with a specific client.

35. An Infiniband-to-native protocol translation apparatus, for routing TCP/IP transactions between a plurality of clients and a plurality of Infiniband devices, the plurality of Infiniband devices being accessed via an Infiniband fabric, the plurality of clients being accessed via a TCP/IP network, the Infiniband-to-native protocol translation apparatus comprising:
an unaccelerated connection processor, configured to bridge the TCP/IP transactions between the plurality of clients and the plurality of Infiniband devices by encapsulating/stripping TCP/IP packets within/from Infiniband raw packets, said unaccelerated connection processor comprising:
an unaccelerated connection correlator, for mapping native addresses to/from Infiniband local identifiers and work queue numbers, wherein said work queue numbers correspond to work queue pairs; and
a target channel adapter, coupled to said unaccelerated connection processor, configured to receive/transmit said Infiniband raw packets from/to the plurality of Infiniband devices responsive to remote direct memory access operations issued to said work queue pairs; wherein said unaccelerated connection processor encapsulates/strips said TCP/IP packets within/from Infiniband raw packets according to said mapping.

36. The Infiniband-to-native protocol translation apparatus as recited in claim 35, wherein said native addresses comprise MAC addresses.

37. The Infiniband-to-native protocol translation apparatus as recited in claim 35, wherein said native addresses comprise IP addresses.

38. The Infiniband-to-native protocol translation apparatus as recited in claim 35, wherein said Infiniband local identifiers comprise source local identifier, destination local identifier, and work queue number.

39. The Infiniband-to-native protocol translation apparatus as recited in claim 38, wherein said Infiniband local identifiers map said TCP/IP transactions between a particular client and a server connected to an Infiniband fabric.

40. The Infiniband-to-native protocol translation apparatus as recited in claim 38, wherein said Infiniband local identifiers map said TCP/IP transactions between a particular client and a TCP-aware target adapter connected to an Infiniband fabric.

* * * * *